United States Patent
Jung et al.

(10) Patent No.: US 10,405,275 B2
(45) Date of Patent: Sep. 3, 2019

(54) METHOD FOR SUPPORTING MOBILITY FOR TERMINAL IN WIRELESS COMMUNICATION SYSTEM AND TERMINAL UTILIZING THE METHOD

(71) Applicant: LG ELECTRONICS INC., Seoul (KR)

(72) Inventors: Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/563,301

(22) PCT Filed: Mar. 31, 2016

(86) PCT No.: PCT/KR2016/003364
§ 371 (c)(1),
(2) Date: Sep. 29, 2017

(87) PCT Pub. No.: WO2016/159700
PCT Pub. Date: Oct. 6, 2016

(65) Prior Publication Data
US 2018/0124702 A1 May 3, 2018

Related U.S. Application Data

(60) Provisional application No. 62/140,471, filed on Mar. 31, 2015, provisional application No. 62/140,469, (Continued)

(51) Int. Cl.
*H04W 52/02* (2009.01)
*H04W 36/38* (2009.01)
(Continued)

(52) U.S. Cl.
CPC ......... *H04W 52/0225* (2013.01); *H04W 8/08* (2013.01); *H04W 36/0083* (2013.01);
(Continued)

(58) Field of Classification Search
CPC .... H04W 52/0225; H04W 36/03; H04W 8/08
See application file for complete search history.

(56) References Cited

U.S. PATENT DOCUMENTS

| 2010/0184458 A1 | 7/2010 | Fodor et al. |
| 2011/0170516 A1 | 7/2011 | Hu et al. |

(Continued)

FOREIGN PATENT DOCUMENTS

| JP | 2000-341755 A | 12/2000 |
| KR | 10-2012-0134230 A | 12/2012 |

(Continued)

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 8)"; 3GPP TS 36.304 V8.5.0; Mar. 2009; 30 pages.
(Continued)

*Primary Examiner* — Wei Zhao
(74) *Attorney, Agent, or Firm* — Birch, Stewart, Kolasch & Birch, LLP

(57) ABSTRACT

The present invention, a method for operating a reduced power mode carried out by a first terminal in a wireless communication system, comprises the steps of: determining whether a second terminal is to act as a proxy for a mobility-associated procedure of the first terminal; and, on the basis of the determination, entering a reduced power mode, wherein, in the reduced power mode, the mobility-associated procedure for the first terminal may be omitted or carried out with low frequency.

10 Claims, 24 Drawing Sheets

Related U.S. Application Data filed on Mar. 31, 2015, provisional application No. 62/140,470, filed on Mar. 31, 2015, provisional application No. 62/143,224, filed on Apr. 6, 2015.

(51) Int. Cl.

| | | |
|---|---|---|
| *H04W 88/08* | (2009.01) | |
| *H04W 36/00* | (2009.01) | |
| *H04W 36/36* | (2009.01) | |
| *H04W 88/04* | (2009.01) | |
| *H04W 8/08* | (2009.01) | |
| *H04W 84/12* | (2009.01) | |
| *H04W 68/02* | (2009.01) | |
| *H04W 88/18* | (2009.01) | |

(52) U.S. Cl.
CPC ........... *H04W 36/03* (2018.08); *H04W 36/36* (2013.01); *H04W 36/38* (2013.01); *H04W 36/385* (2013.01); *H04W 52/0209* (2013.01); *H04W 52/0219* (2013.01); *H04W 52/0261* (2013.01); *H04W 88/04* (2013.01); *H04W 88/08* (2013.01); *H04W 36/0055* (2013.01); *H04W 36/0079* (2018.08); *H04W 68/02* (2013.01); *H04W 84/12* (2013.01); *H04W 88/182* (2013.01); *Y02D 70/124* (2018.01); *Y02D 70/126* (2018.01); *Y02D 70/1242* (2018.01); *Y02D 70/1262* (2018.01); *Y02D 70/1264* (2018.01); *Y02D 70/14* (2018.01); *Y02D 70/142* (2018.01); *Y02D 70/144* (2018.01); *Y02D 70/162* (2018.01); *Y02D 70/21* (2018.01); *Y02D 70/23* (2018.01); *Y02D 70/24* (2018.01); *Y02D 70/26* (2018.01)

(56) References Cited

U.S. PATENT DOCUMENTS

| | | | |
|---|---|---|---|
| 2011/0183676 A1* | 7/2011 | Lee | H04W 36/0072 455/438 |
| 2012/0164979 A1* | 6/2012 | Bachmann | H04L 63/164 455/411 |
| 2014/0036873 A1* | 2/2014 | Cheng | H04W 36/0022 370/331 |
| 2015/0373689 A1 | 12/2015 | Tabet et al. | |
| 2016/0007256 A1 | 1/2016 | Chu et al. | |
| 2016/0150443 A1 | 5/2016 | Suryavanshi et al. | |

FOREIGN PATENT DOCUMENTS

| | | |
|---|---|---|
| KR | 10-2013-0009847 A | 1/2013 |
| KR | 10-2013-0105727 A | 9/2013 |
| WO | WO 2009/145431 A2 | 12/2009 |
| WO | WO 2015/026197 A1 | 2/2015 |

OTHER PUBLICATIONS

LG Electronics Inc., "Cell selection and reelection on ProSe operating frequency", R2-150536; 3GPP TSG-RAN WG2 #89, Athens, Greese, Feb. 9-13, 2015, 3 pages.

\* cited by examiner

METHOD FOR SUPPORTING MOBILITY FOR TERMINAL IN WIRELESS COMMUNICATION SYSTEM AND TERMINAL UTILIZING THE METHOD

CROSS REFERENCE TO RELATED APPLICATIONS

This application is the National Phase of PCT International Application No. PCT/KR2016/003364, filed on Mar. 31, 2016, which claims priority under 35 U.S.C. 119(e) to U.S. Provisional Application No. 62/140,471, filed on Mar. 31, 2015, No. 62/140,469, filed on Mar. 31, 2015, No. 62/140,470, filed on Mar. 31, 2015, and No. 62/143,224, filed on Apr. 6, 2015, all of which are hereby expressly incorporated by reference into the present application.

BACKGROUND OF THE INVENTION

Field of the Invention

The present invention relates to wireless communications, and more particularly, relates to a method for supporting the mobility for a terminal in a wireless communication system and a terminal utilizing the same.

Related Art

In the International Telecommunication Union Radio communication sector (ITU-R), the standardization task of the International Mobile Telecommunication (IMT)-Advanced, which is the next generation mobile communication system after the third generation, has been progressed. The IMT-Advanced aims to support the multimedia service based in Internet Protocol (IP) with the data transmission rate of 1 Gbps in stop and low speed mobile state, and 100 Mbps in high speed mobile state.

3rd Generation Partnership Project (3GPP) is a system standard that satisfies the requirements of the IMT-Advanced, and is preparing LTE-Advanced (LTE-A) that improves Long Term Evolution (LTE) based on the Orthogonal Frequency Division Multiple Access (OFDMA)/Single Carrier-Frequency Division Multiple Access (SC-FDMA) transmission scheme.

Recently, owing to the development of the information communication industry, a user may have a variety of terminals simultaneously. For example, the case is increasing that a user has a smart phone and a smart watch, a user has a smart phone and a tablet PC, or a user has a smart watch and a tablet PC.

In the case that all of the terminals possessed by a user perform the procedure for each of the conventional cellular operations, an operation time of a terminal of which battery capacity is relatively small is shorter than an operation time of a terminal of which battery capacity is relatively great. For example, in the case that a user has both of a smart phone and a smart watch, and both of the smart phone and the smart watch perform the cellular operation, a battery of the smart watch of which battery capacity is smaller than that of the smart phone is discharged fast, and accordingly, the function of the smart watch is not fully fulfilled. Accordingly, a method and apparatus is required to solve the problem described above.

SUMMARY OF THE INVENTION

An object of the present invention is to provide a method for supporting the mobility for a terminal in a wireless communication system and a terminal utilizing the same.

In an aspect, a method for operating a power saving mode performed by a first user equipment (UE) in a wireless communication system is provided. The method comprises determining whether a second UE acts a proxy for a procedure in relation to mobility for the first UE and entering a power saving mode based on the determination, wherein the procedure in relation to mobility of the first UE is not performed or performed with low frequency in the power saving mode.

A user of the first UE and a user of the second UE may be identical, and wherein an amount of battery of the first UE is smaller than an amount of battery of the second UE.

The method may further comprise transmitting information of the determination to a network.

In the power saving mode, a measurement of a serving cell and a neighboring cell required for performing the procedure in relation to mobility may be not performed, a measurement of a serving cell and a neighboring cell required for performing the procedure in relation to mobility is performed with low frequency in comparison with the second UE, a paging reception is omitted, or a paging reception is performed with low frequency.

The method may further comprise receiving information of a serving cell through the second UE, in the power saving mode.

The information of the serving cell may include at least one of a serving cell identity, a serving cell frequency, system information set 1, or system information set 2.

The method may further comprise receiving a paging message for the first UE through the second UE and returning to a normal mode based on the information of the serving cell.

The method may further comprise transmitting the information indicating returning to the normal mode to the second UE after returning to the normal mode.

The method may further comprise returning to a normal mode based on the information of the serving cell when a mobile originating data is generated.

The method may further comprise receiving a paging message for the first UE through the second UE, requesting the information of the serving cell to the second UE and returning to a normal mode based on the information of the serving cell, wherein receiving the information of the serving cell through the second UE is performed after requesting the information of the serving cell.

The method may further comprise requesting the information of the serving cell to the second UE when a mobile originating data is generated and returning to a normal mode based on the information of the serving cell, wherein receiving the information of the serving cell through the second UE is performed after requesting the information of the serving cell to the second UE.

The first UE may be in a Radio Resource Control (RRC) idle state.

In other aspects, a user equipment (UE) is provided. The UE comprises a radio frequency (RF) unit configured to transmit and receive a radio signal and a processor configured to operate with being connected with the RF unit, wherein the processor is configured to perform determining whether another UE acts a proxy for a procedure in relation to mobility for the UE and entering a power saving mode based on the determination, wherein the procedure in relation to mobility of the UE is not performed or performed with low frequency in the power saving mode.

According to the present invention, a method for supporting the mobility for a terminal in a wireless communication system and a terminal utilizing the same are provided.

According to the present invention, a terminal may receive the information of other terminal from a network in place of the other terminal, and accordingly, may transmit the received information to the other UE.

According to the present invention, a terminal may receive the information of other terminal from a network in place of the other terminal, and in this case, the other terminal may enter a state for saving power while the terminal receives the information.

According to the present invention, a terminal may receive the mobility related information for other terminal from a network, and in this case, the other terminal may enter a state for saving power while the terminal receives the mobility related information. That is, while the terminal receives the mobility related information for other terminal in place of the other terminal, the other terminal enters a state for saving power, and accordingly, the other terminal may save power and the battery efficiency of the other terminal increases.

DESCRIPTION OF EXEMPLARY EMBODIMENTS

Figure 1:
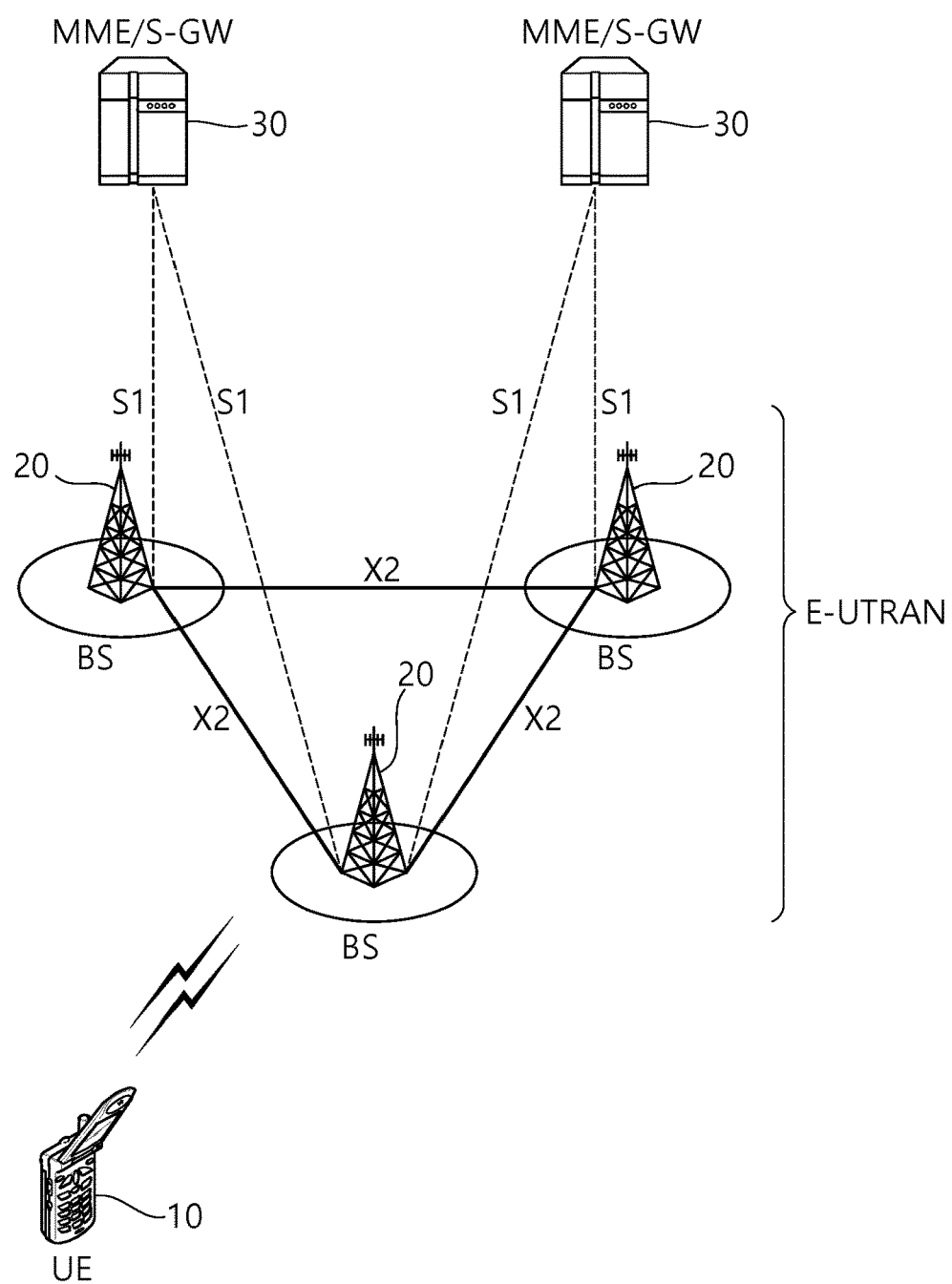
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
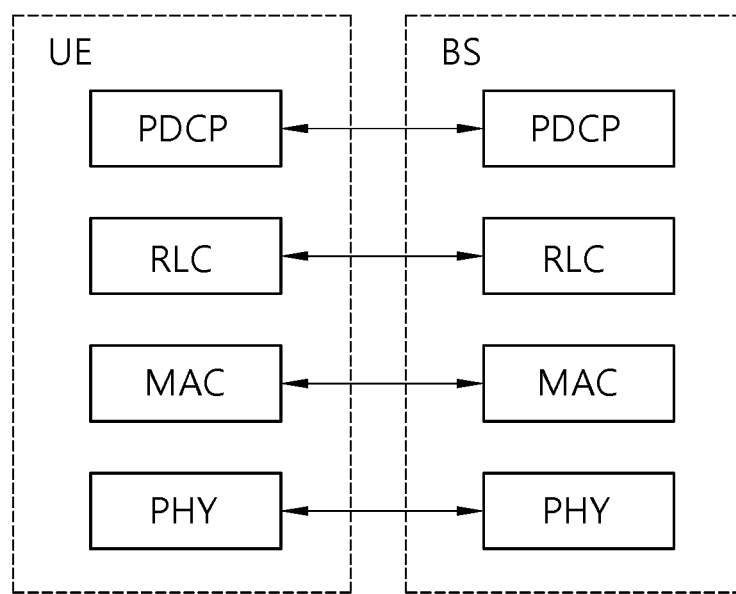
FIG. 2 is a diagram showing a wireless protocol architecture for a user plane.
Figure 3:
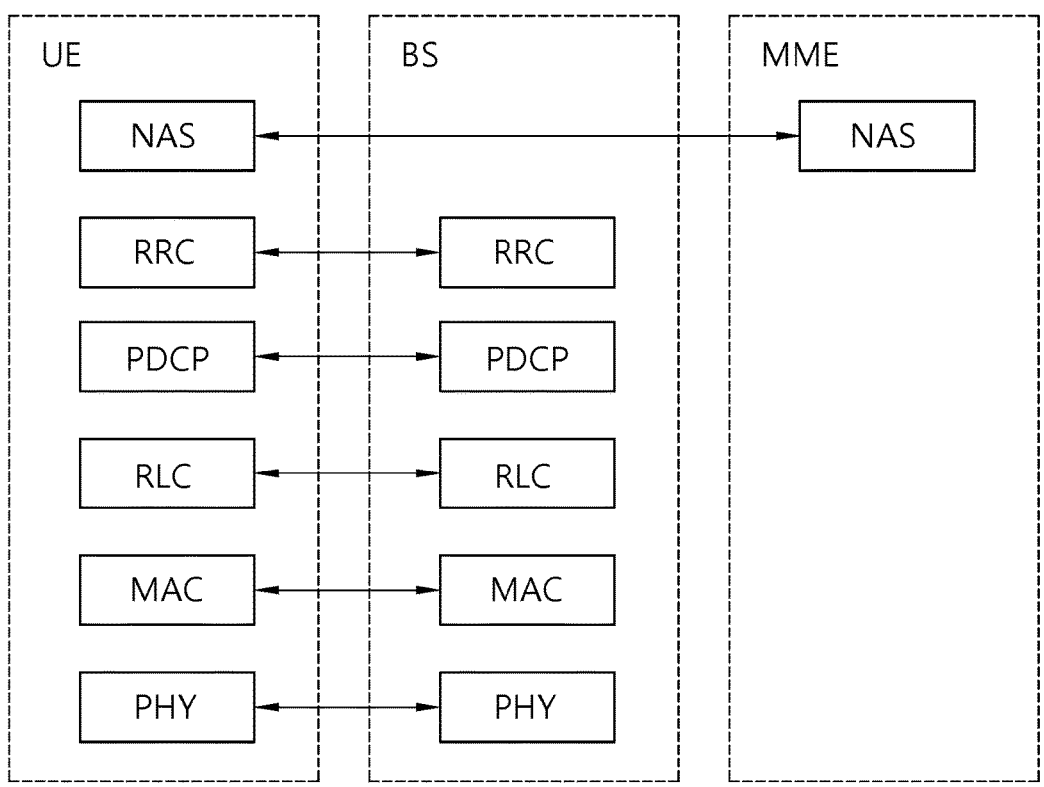
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
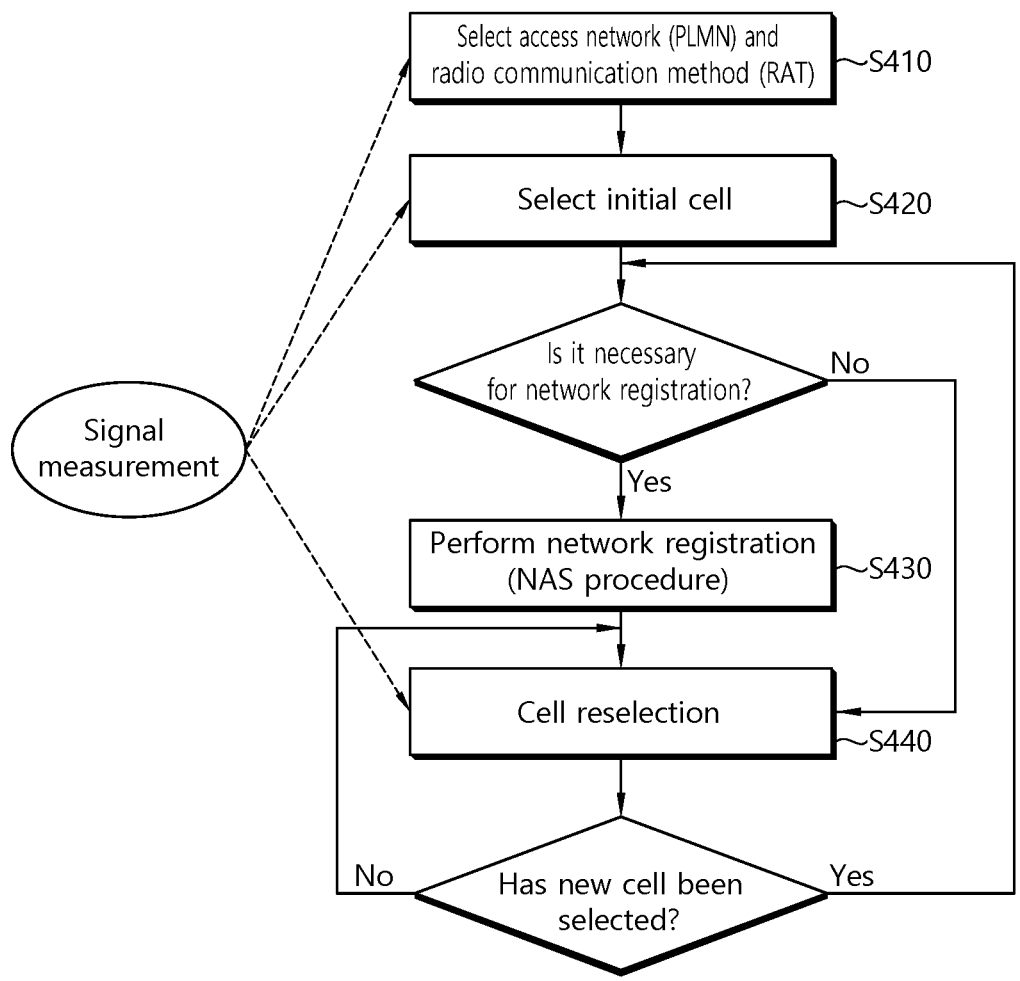
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
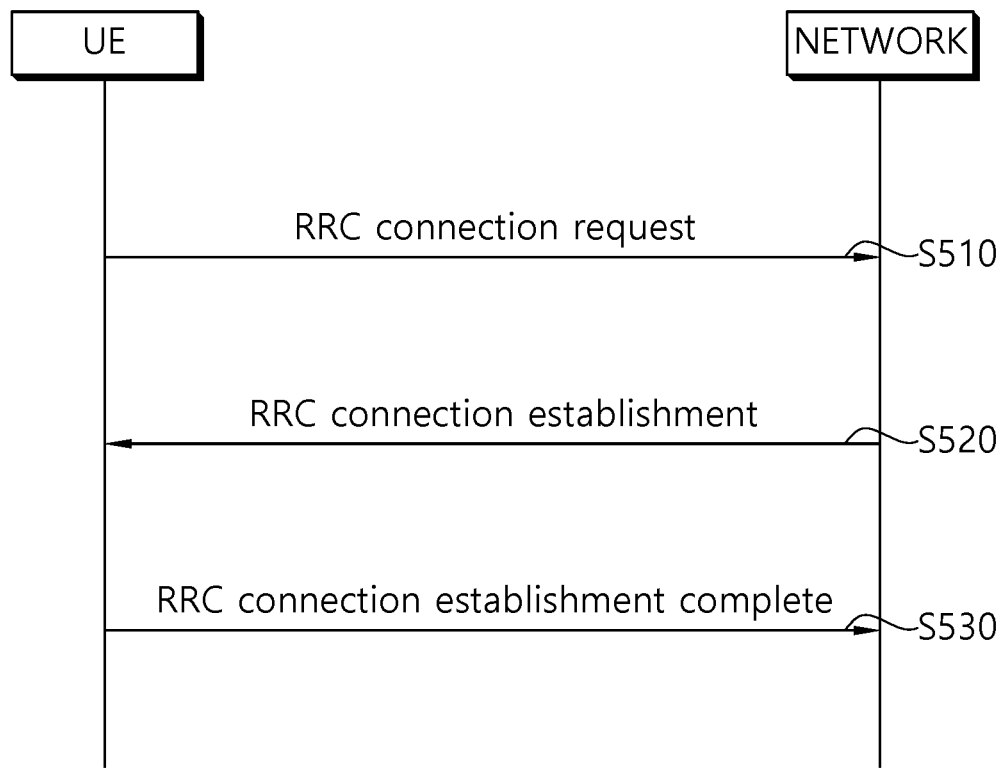
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
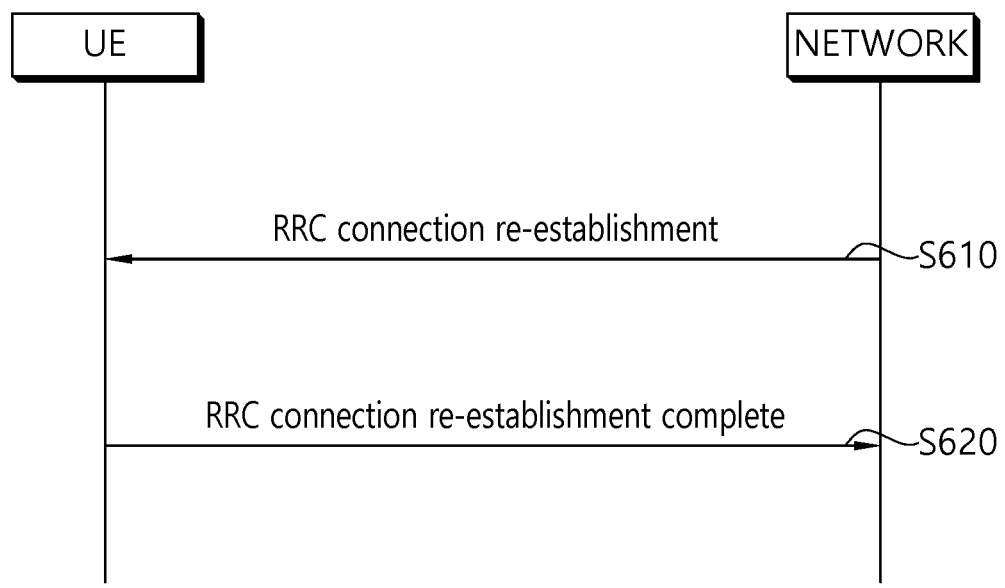
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$Srxlev>0 \text{ AND } Squal>0, \quad \text{[Equation 1]}$$

where:
$Srxlev = Q_{rxlevmeas} - (Q_{rxlevmin} + Q_{rxlevminoffset}) - P_{compensation}$,
$Squal = Q_{qualmeas} - (Q_{qualmin} + Q_{qualminoffset})$ In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |

TABLE 1-continued

| | |
|---|---|
| $P_{PowerClass}$ | Maximum RF output power of the UE (dBm) according to the UE power class as defined in [TS 36.101] |

$Q_{rxlevminoffset}$ and $Q_{qualminoffset}$, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, R_n = Q_{meas,n} - Q_{offset}$$ [Equation 2]

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
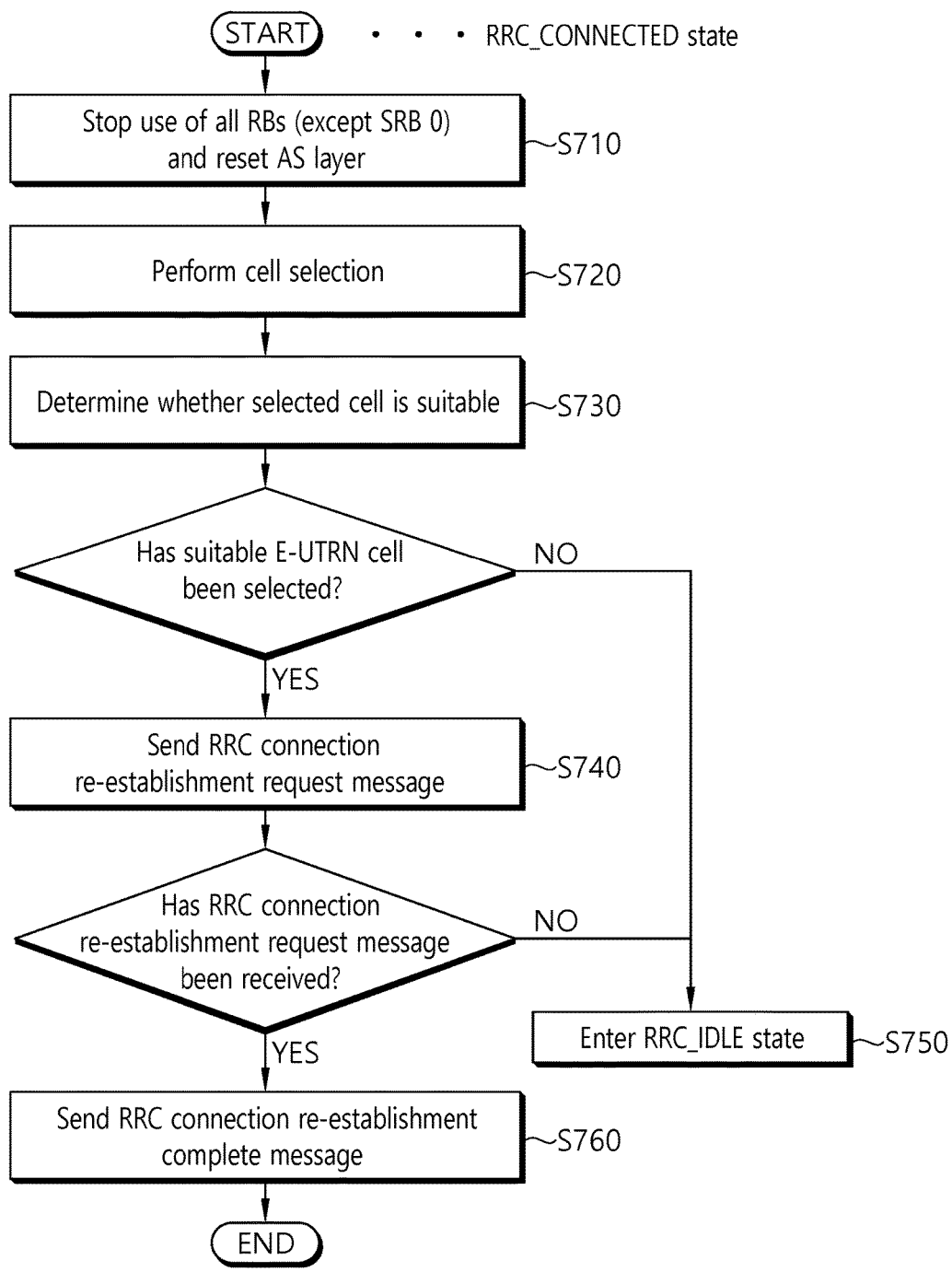
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
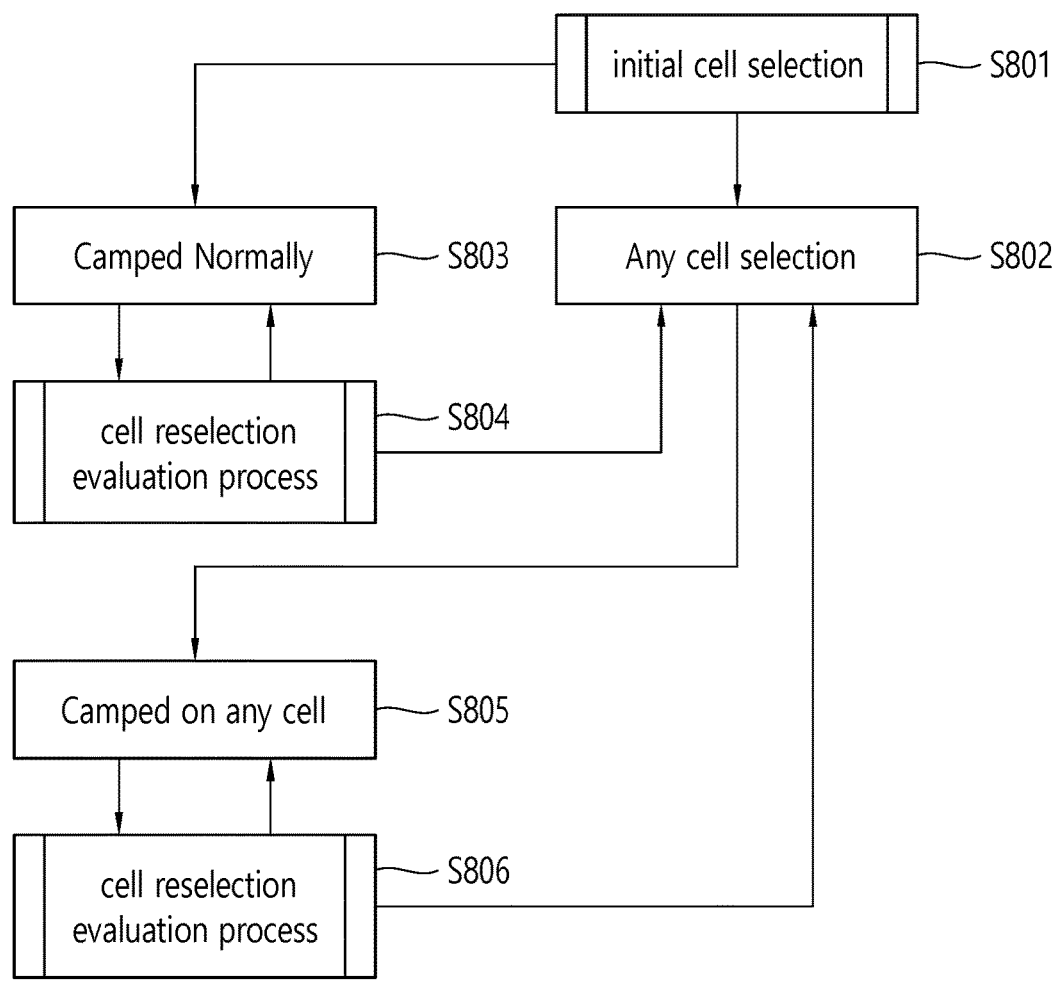
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
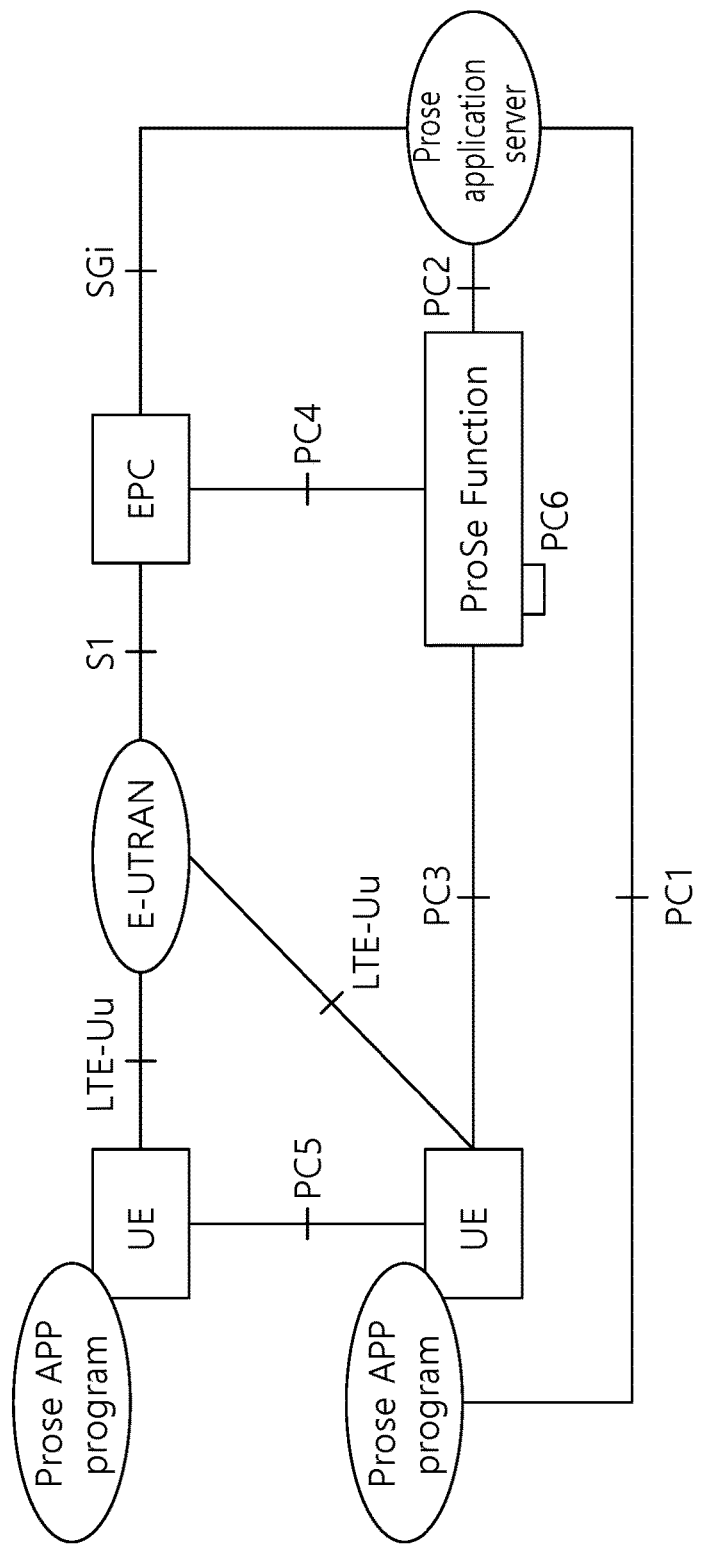
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

Hereinafter, the handover will be described.

A handover signaling procedure supports both of an inter-eNB handover and an inter-RAT handover. In this case, the inter-RAT handover is initiated through the S1 interface described above, and the inter-eNB handover is initiated through X2 interface, generally.

However, in the case that a source eNB is not an RN, and X2 is not existed between a source eNB and a target eNB, or in the case that a source eNB is an RN, and X2 is not existed between a DeNB and a target eNB or X2 is not existed between a source RN and a DeNB, or in the case that a source eNB is an RN, and a serving MME of a UE is not included in MME pool(s) connected with a target eNB, or in the case that it is configured to initiate a handover to a specific eNB through S1 such that a source eNB is able to change an EPC node (MME and/or serving GW), or in the case that a source eNB is going to start an inter-eNB handover through X2 but receives a negative response from a target eNB with a specific cause value, The inter-eNB handover is initiated through the S1 interface.

Figure 10:
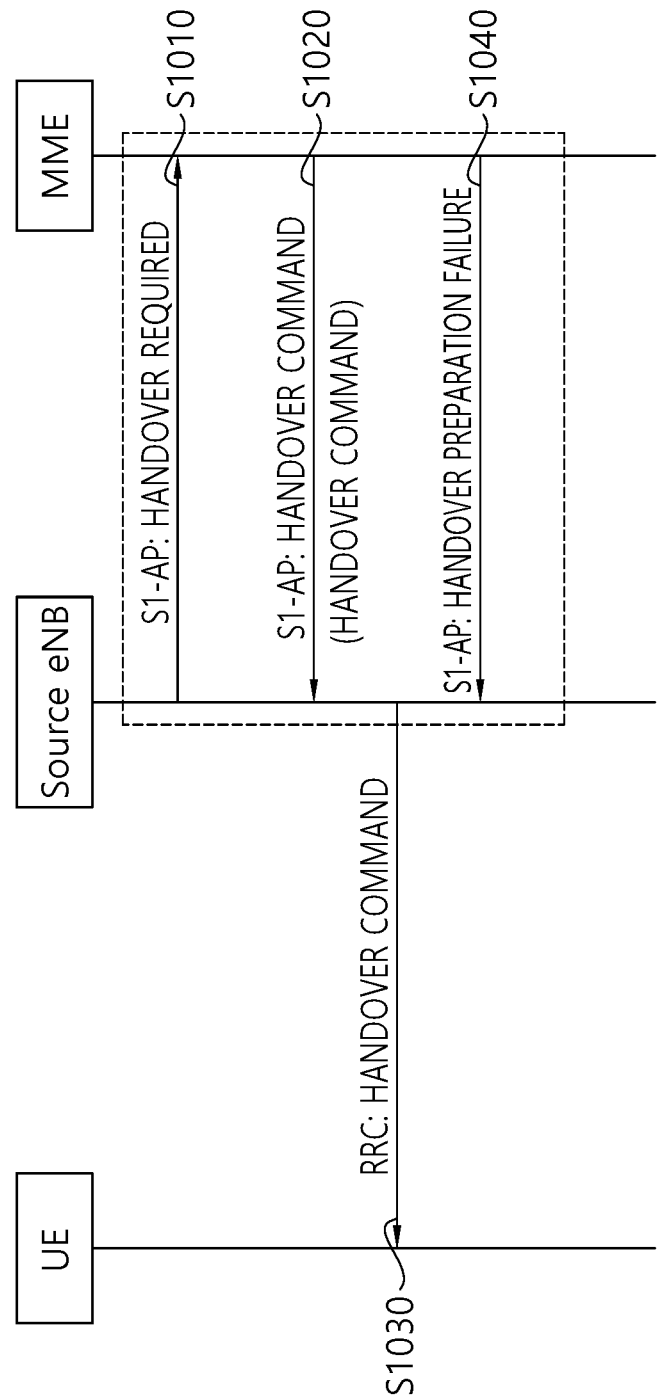
FIG. 10 is a flowchart for a handover ready procedure.

FIG. 10 is a flowchart for a handover ready procedure.

Referring to FIG. 10, a source eNB transmits a handover request message to an MME (step, S1010).

Later, the source eNB receives a handover command message from the MME (step, S1020).

The source eNB may transmit the handover command message to a UE (step, S1030).

Upon receiving the handover command message from the source eNB (in this case, the handover command message includes information in relation to a radio interface (e.g., a handover command for the UE) a successfully established Enhanced Radio Access Bearer (E-RAB) and an E-RAB of which setup is failed), the handover ready procedure is finished.

In the case that a handover resource allocation is failed (e.g., in the case that there is no available resource on a target), the source eNB receives a handover ready failure message, instead of receiving the handover command message from the MME (step, S1040).

Figure 11:
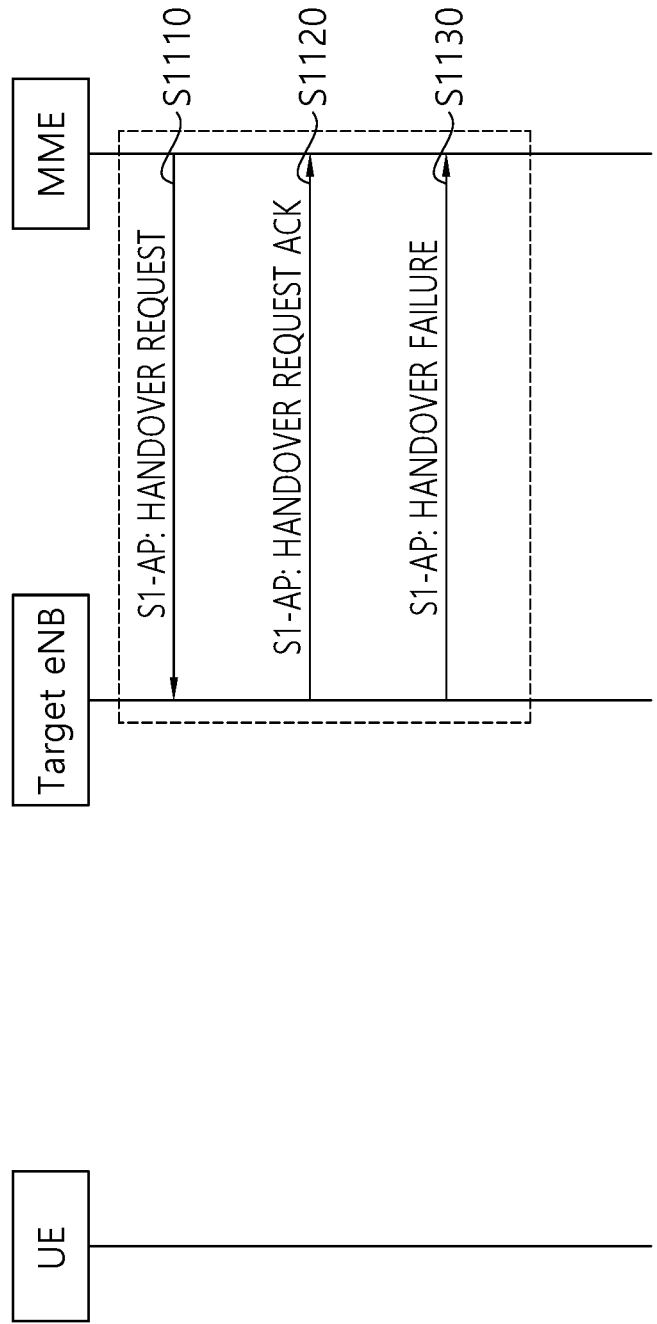
FIG. 11 is a flowchart for a handover resource allocation procedure.

FIG. 11 is a flowchart for a handover resource allocation procedure.

Referring to FIG. 11, a target eNB receives a handover request message from an MME (step, S1110), and the handover request message may include an E-RAB which is required to be setup by the target eNB.

In this case, for a UE that performs handover to an RN, the handover request message may be received by a DeNB. Here, the DeNB reads a target cell ID from the message, finds a target RN that corresponds to the target cell ID, and forwards the message to the target RN.

Later, the target eNB transmits a handover request ACK to the MME (step, S1120). More particularly, after allocating resources required for all accepted E-RAB, the target eNB may respond to the handover request ACK message. In this case, the handover request ACK message may include a successfully established E-RAB, an E-RAB of which setup is failed and information in relation to a radio interface (e.g., a handover command for the UE).

In the case that there is no available resource on an aspect of a target, the target eNB responds with a handover failure message, that is, transmits a handover failure message to the MME, instead of transmitting the handover request ACK message (step, S1130).

Hereinafter, the paging will be described.

Figure 12:
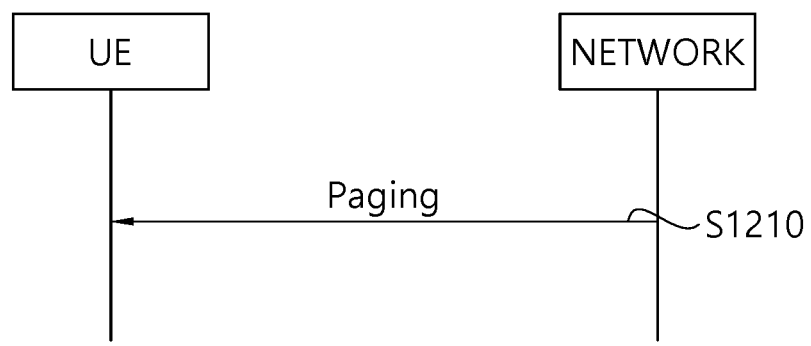
FIG. 12 is a flowchart schematically illustrating a procedure of paging.

FIG. 12 is a flowchart schematically illustrating a procedure of paging.

Referring to FIG. 12, a UE may receive a paging message from a network (step, S1210).

More particularly, an object of the procedure that the UE receives a paging message may be, for a transmission of paging information to the UE, when the network is in an RRC idle state and/or for informing a change of system information for the UEs in an RRC idle state and the UEs in an RRC connected state by the network, and/or for informing an ETWS primary notification and/or an ETWS secondary notification by the network, and/or for informing a CMAS notification by the network.

The paging information may be provided to a higher layer (e.g., NAS).

The network may initiate the paging procedure by transmitting a paging message on a paging occasion of the UE. In addition, the network may address the paging message to a plurality of UEs by including a paging record for each of the UEs in the paging message. Likewise, the network may indicate a change of the system information and/or provide an ETWS notification or a CMAS notification through (or based on) the paging message. The paging occasion may also be written as a paging time, and the paging time may include information indicating one or more radio frame numbers and one or more subframe numbers or an index indicating the radio frame and the subframe.

Hereinafter, the present invention will be described in detail.

Recently, owing to the development of the information communication industry, a user may have a variety of terminals simultaneously. For example, the case is increasing that a user has a smart phone and a smart watch, a user has a smart phone and a tablet PC, or a user has a smart watch and a tablet PC.

Each of a plurality of UEs possessed by a user may have a capability of performing a cellular operation. That is, each of a plurality of UEs may have a capability of performing a communication with an eNB independently. However, in the case that all of the UEs perform the procedure for each of the conventional cellular operations, an operation time of a UE of which battery capacity is relatively small is shorter than an operation time of a UE of which battery capacity is relatively great. For example, in the case that a user has both of a smart phone and a smart watch, and both of the smart phone and the smart watch perform the cellular operation and assuming that the amount of power consumed are the same, a battery of the smart watch of which battery capacity is smaller than that of the smart phone is discharged fast, and accordingly, the function of the smart watch is not fully fulfilled.

In the case that a plurality of UEs is proximate with each other as the case that a user has all of the UEs, a plurality of the UEs undergoes similar channel environment with respect to a specific network node (e.g., an eNB) that is going to communicate with. In addition, as described above, a plurality of the UEs has the common feature. In the conventional art, even in the case that each of a plurality of the UEs that is going to perform the cellular communication operation is in a similar channel environment, each of a plurality of the UEs performs all procedures (e.g., mobility procedure, paging procedure, handover procedure, scheduling procedure, etc.) that are required for the operation of the cellular communication. In addition, the UEs perform the cellular communication procedure independently without considering the characteristics that the UEs provide a communication service to the same user.

In the case that a plurality of UEs provides a communication service to the same user or a plurality of UEs undergoes the similar channel environment, it is available for a specific UE among a plurality of the UEs to act as a proxy for the cellular communication procedure that other UE should perform. Particularly, when a capability of each of the UEs, for example, a processing power and/or battery capacity/residual battery amount is different, it is preferable for a UE that has enough capability acts as a proxy for the cellular communication procedure of a UE that has insufficient capability. As an example, it may be considered that the UE of great battery total capacity or residual battery capacity acts as a proxy for a part of the cellular procedure that should be performed by a UE of small battery total capacity or residual battery capacity.

Hereinafter, a method is proposed for guaranteeing a service quality that a user requires while minimizing the power consumption consumed by UEs when performing a cooperative communication between UEs (coordinated Tx/Rx), in the case that at least one of the following conditions are satisfied: 1) a user has a plurality of UEs, 2) a plurality of UEs is located normally proximate distance, 3) each of a plurality of UEs supports the cellular communication, 4) each of a plurality of UEs may perform the cellular communication when the cellular communication is required, 5) in the proximate range, a plurality of UEs supports the technique (e.g., WLAN or Bluetooth or sidelink communication based on LTE), which is able to perform a communication between a plurality of UEs with relatively low power in comparison with the cellular communication, 6) a battery capacity of a specific UE is small among a plurality of UEs and sensitive to the power consumption. As an example of the method, a method is proposed that a UE of which battery total capacity/residual battery capacity is relatively great acts as a proxy for a part of the cellular procedure of a UE of which battery total capacity/residual battery capacity is relatively small.

For example, in the case that UE 1 is a device (smart watch) of which battery capacity is small and UE 2 is a device (smart phone) of which battery capacity is great, a method and apparatus is to be proposed that UE 2 acts as a proxy for a procedure required for the cellular communication (transmission/reception) with a network and the cellular management in place of UE 1 such that UE 1 may operate in the power saving mode in an RRC connected mode with the aid of UE 2. Hereinafter, the process that UE 2 acts as a proxy for the cellular procedure for UE 1 may be called that UE 2 provides a proxy-operation or a proxy-operation service to UE 1.

Hereinafter, for the convenience of description, the UE provided with the proxy-operation service from another UE is named as "a first UE" or "UE 1", and the UE that provides the proxy-operation service to another UE is named as "a second UE or "UE 2". As described above, the second UE may be a UE of which battery capacity/residual capacity is relatively greater than that of the first UE, or a UE of which computation capacity is relatively superior to that of the first UE. In addition, hereinafter, for the convenience of description, it will be described that the second UE acts as a proxy for the operation of the first UE. However, it is understood that this is just for the convenience of description, and the operation that the first UE acts as a proxy for the operation of the second UE is not excluded in the scope of the present invention.

Figure 13:
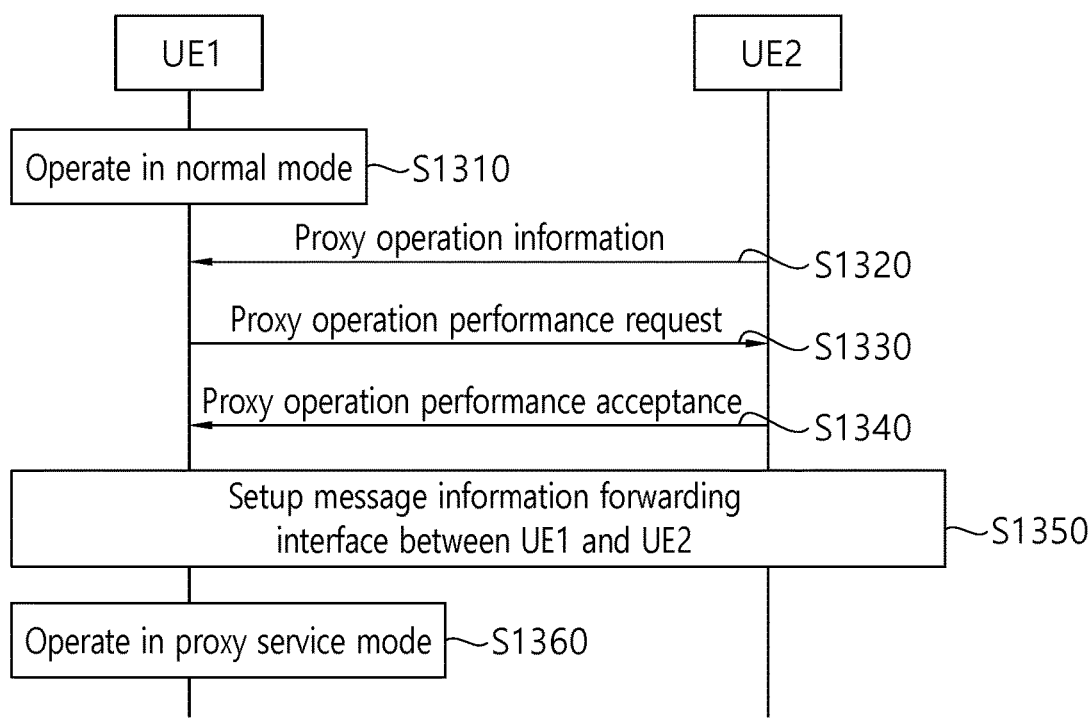
FIG. 13 is a flowchart for a procedure of determining a proxy-operation performance according to an embodiment of the present invention.

FIG. 13 is a flowchart for a procedure of determining a proxy-operation performance according to an embodiment of the present invention.

Referring to FIG. 13, a first UE operates in a normal mode (step, S1310). Here, the fact that the first UE operates in a normal mode may mean that the first UE is on performing a general procedure for the cellular communication (e.g., mobility procedure, paging procedure, handover procedure, scheduling procedure, etc.).

The second UE may determine to act as a proxy for the procedure in relation to the cellular communication of the first UE, that is, to perform a proxy-operation (may also be referred as an agent operation). As described above, it may be called that the second UE provides a proxy-operation/proxy service to the first UE, or it may be represented that the second UE performs a proxy-operation for the first UE. The proxy-operation/proxy service may be referred as the second UE transmits and receives a signal of the first UE in place of the first UE. In the transmission and reception proxy of a signal, the signal of the first UE may mean a signal that an eNB is going to transmit to the first UE (like the conventional art) in the aspect of UE-dedicated signaling of downlink. The signal of the first UE may mean a signal of an eNB that the first UE should be measured for the connection management or the link quality measurement generally (like the conventional art) in the aspect of broadcast/common signaling of downlink. In the transmission and reception proxy of a signal, the signal of the first UE may mean a signal that the first UE is going to transmit to an eNB through common signaling or UE-dedicated signaling (like the conventional art) in the aspect of uplink. That is, in the transmission and reception proxy of a signal, the signal may include at least one of a control signal and data.

Here, the procedure of determining the proxy-operation may be triggered by the first UE or the second UE. For example, the second UE may broadcast the proxy operation information to at least one neighboring UE or may transmit the proxy operation information to a specific (or appointed) UE such as the first UE (step, S1320). In this case, the operation that the first UE receives the proxy operation information from the second UE is not an essential process of the present invention, but the first UE may transmit a proxy-operation request to the second UE by its own determination of the first UE. That is, the proxy-operation of the second UE may be triggered by the first UE.

The proxy operation information may include a factor representing whether the proxy-operation service is available, an identity of the second UE or a user code of the second UE, a service/application code in which the proxy operation is available to be provided, a type of direct communication link supportable, serving cell information of the second UE, and the like.

The first UE may determine whether the second UE is able to provide the proxy-operation service to the first UE itself based on the UE identity/user code/service code included in the received proxy operation information.

For example, the first UE may determine whether the second UE is able to provide the proxy-operation service to the first UE itself based on the UE identity/user code/service code included in the proxy operation information. The first UE may identify whether the second UE is a UE proper to provide the proxy-operation service by sending an inquiry through information stored in advance or to a network (e.g., proxy-operation service server existed in a network).

In the case that a service code is included in the proxy operation information, the first UE may operate as follows. When the service code that corresponds to a service that the first UE provides to a user is included in the received proxy operation information, the first UE may regard the second UE as a UE proper to provide the proxy operation service.

The direct communication link that is supportable in the proxy operation information means the communication link information used when exchanging message/data between UEs for the proxy operation service. Types of the direct communication link may include the communication links supported among the operation of Wi-Fi type (802.11 type), ZigBee type (802.15.4 type), Bluetooth type, sidelink in LTE-based licensed band and sidelink in LTE-based unlicensed band. For each communication link, the detailed parameter/capability information of the link may be provided, which is required for a connection between UEs of the corresponding link. In the case that a plurality of direct communication links is indicated, a priority value of each communication link may be indicated together. As serving cell information of the second UE, a serving cell identifier and a PLMN ID list in which the serving cell is belonged may be provided.

The proxy-operation information may be transmitted to a neighboring UE with being encrypted (e.g., with an integrity protection) or together with a digital signature. The first UE receives the proxy-operation information and decrypts and verifies the received information according to the encryption, and may perform the proxy-operation through the second UE only in the case that the information is verified.

After receiving the proxy-operation information, the first UE may transmit a message (proxy-operation performance request message) requesting to performing the proxy-operation to the second UE (step, S1330). As described above, the first UE may transmit the proxy-operation performance request message to the second UE after receiving the proxy-operation information. Otherwise, even in the case that the first UE fails to receive the proxy-operation information, the first UE may transmit the proxy-operation performance request message to the second UE with its own determination of the first UE.

Here, the proxy-operation performance request message may be i) directly transmitted to the second UE, ii) transmitted to the second UE through an eNB, or iii) transmitted to the second UE through an MME. The proxy-operation performance request message may be transmitted to the second UE through a direct communication link between UEs. An example of the direct communication link is one of Wi-Fi type (802.11 type), ZigBee type (802.15.4 type), Bluetooth type, sidelink in LTE-based licensed band and sidelink in LTE-based unlicensed band. Generally, the first UE may select a preferable link among the direct communication links. A determination of the preference among links may be according to the determination of an inner part of the first UE based on a link priority stored in the first UE in advance, a user configuration or at least one of the QoS of the service provided by the first UE and the residual battery capacity situation. In the case that the second UE notifies the preference among the direct communication links to the first UE already, the first UE may use the communication link that the second UE designates as the highest priority. The detailed example that the proxy-operation performance request message is transmitted to the second UE through an eNB or an MME will be described below.

For the proxy-operation performance request, the first UE may forward the following information to the second UE or a network node (e.g., an eNB or an MME, an HSS or a proxy-operation service server). In the case that the following information is forwarded to a network node, the information may be forwarded to the network node through the second UE. The information of the proxy-operation performance request may include a user code of the first UE, a user code of the second UE, a service code that the first UE wishes to be provided with the proxy-operation, a user preference, pre-configuration for the proxy-operation of the first and second UEs, a type of direct communication link usable between the first UE and the second UE, a direct link quality between first UE and the second UE, a signal reception quality of a specific cell measured by the first UE, a serving cell identifier of the first UE, and the like. Based on the information, it may be determined whether the proxy-operation performance request is accepted. The method of determining whether proxy-operation performance request is accepted includes 1) a method that the second UE determines whether to accept it finally and notifies the determination to a network and 2) a method that a network determines whether to accept it finally and notifies the acceptance to the second UE.

More particularly, in order to request the proxy-operation performance to the second UE or a network node (e.g., an eNB or an MME, an HSS or a proxy-operation service server), the first UE may transmit at least one of the following information.

User preference information of the first UE: For example, a user of the first UE may prefer the proxy-operation through the second UE. That is, in the case that the first UE (smart watch) and the second UE (smart phone) are possessed by the same user, the user may prefer that the second UE acts as a proxy for the operation of the first UE, which may be notified to the second UE by the first UE.

A user identifier/code of the first UE and/or a user identifier/code of the second UE. A UE or a network node that receives a user identifier/code to which the first UE is belonged and/or a user identifier/code to which the second UE is belonged may identify that the proxy-operation service performance is proper based on the information stored in advance or by performing an inquiry to the proxy-operation service server. The user identifier/code of the UE may be allocated from a network (e.g., MME) in a procedure that each UE registers in a cellular network or a subsequent procedure (i.e., Non-Access Stratum procedure), or may be allocated from a network (e.g., proxy-operation service server) through a separate proxy operation preparation procedure that may be performed before the procedure of the proxy operation performance request-acceptance.

A service code that the first UE wishes to be provided with the proxy-operation/a service code that the second UE may provide the proxy operation. Based on the information, it may be determined whether it is proper or not to provide a proxy operation service in relation to a specific service between two UEs. The identifier/code corresponding to each service may be allocated from a network (e.g., MME) in a procedure that a UE registers in a cellular network or a subsequent procedure (i.e., Non-Access Stratum (NAS) procedure), or may be allocated from a network (e.g., proxy-operation service server) through a separate proxy operation preparation procedure that may be performed before the procedure of the proxy operation performance request-acceptance.

Pre-configured association information of the first UE and the second UE (i.e., the information indicating that the first UE and the second UE are associated for the operation of the present invention. For example, it may be identified that there may be the pre-configured association between the UEs of the same user or the UEs of different users included in the same user group.).

A type of direct communication link supported between the first UE and the second UE. An example of the direct communication link is one of Wi-Fi type (802.11 type), ZigBee type (802.15.4 type), Bluetooth type, sidelink in LTE-based licensed band and sidelink in LTE-based unlicensed band. A network may designate a specific communication link or provide a usable communication link list to a proxy operation provider/receiver UE using the direct communication link that may be used for the proxy operation.

Link quality information between the first UE and the second UE measured by the first UE. For example, the second UE may transmit a reference signal or data to the link or the first UE may measure a reception quality of the reference signal and notify it to the second UE. For this, the second UE may broadcast the reference signal used for a measurement periodically. Here, the link quality may mean a sidelink link quality. As another example, the link may be a link quality of Wi-Fi (e.g., measured Received Signal Strength Indicator (RSSI)).

A reception quality of a signal such as RSRP/RSRQ of a specific cell measured by the first UE. For example, the first UE may measure a reception quality of a signal targeted to the cell designated by its own serving cell or the second UE (e.g., a serving cell of the second UE) and notify it to the second UE.

Serving cell information of the first UE (e.g., a serving cell ID of the first UE) and PLMN information (e.g., R-PLMN ID that the first UE registers or selected PLMN ID)

An RRC state of the first UE. For example, it may be identified whether the state is an RRC_IDLE or an RRC_CONNECTED.

A proxy operation procedure list that the first UE wishes to be provided. The proxy operation procedure list means a list that notifies the proxy operation procedure that the first UE wishes to be provided from the second UE among the procedures that the first UE is required to perform the cellular communication. For example, the list may indicate a paging procedure proxy, a scheduling monitoring proxy, a data transmission and reception proxy (particularly, it is available to be specifically indicated such as a transmission only proxy, a reception only proxy, and transmission and reception proxy, etc.), a control message transmission and reception proxy (it is also available to particularly indicate such as an RRC message transmission and reception proxy, a NAS message transmission and reception proxy, etc.), a mobility procedure proxy (it is also available to particularly indicate such as an idle mode mobility proxy, a connected mode mobility proxy, etc.).

A proxy operation procedure list that the second UE may provide. This list means a list that notifies a proxy operation that the second UE may provide to the first UE such that the first UE may perform the cellular communication through the second UE. An example of the proxy operation that may be included in the list is the same as that of the proxy operation included in the proxy operation procedure list that the first UE wishes to be provided.

In response to the proxy operation performance request, the first UE receives a proxy operation performance acceptance message from the second UE (step, S1340). The proxy operation performance acceptance message (i.e., a message in response to the proxy operation request) may include the following information.

A service code that the second UE is decided to provide for the proxy operation.

A type of direct communication link between the first UE and the second UE used for the proxy operation and a link configuration parameter.

Link quality information between the first UE and the second UE measured by the second UE.

A reception quality of a signal such as RSRP/RSRQ of a specific cell measured by the second UE.

Serving cell information of the second UE (e.g., a serving cell ID of the first UE) and PLMN information (e.g., R-PLMN ID that the first UE registers or selected PLMN ID)

An RRC state of the second UE.

A proxy operation procedure list that the second UE determines to provide.

As described above, in the case that performing of the proxy operation is determined through signaling between UEs, either one of the UEs (i.e., the first UE or the second UE) among the UEs associated with the proxy operation may notify that performing of the proxy operation is determined to a network.

For example, the second UE that is going to act as a proxy for the mobility procedure may notify that the second UE is going to act as a proxy for the mobility procedure of the first UE to its own serving cell. In this case, the eNB belonged to the serving cell of the second UE may request and receive the UE context of the first UE (e.g., the UE capacity of the first UE), the service information of the first UE and the bearer configuration information (including QoS parameter) of the first UE to a serving cell eNB of the first UE or an MME that corresponds to the R-PLMN of the first UE.

As another example, the second UE that is going to act as a proxy for the mobility procedure may notify that the second UE is going to act as a proxy for the mobility procedure of the first UE to its own serving CN (e.g., MME) through a NAS message. In this case, the CN node may make the UE context of the second UE include the UE context of the first UE. That is, the UE context of the second UE may be updated to further include the UE context of the first UE, and the updated UE context of the second UE may be transmitted to the eNB of the second UE (according to this scheme, a change of the eNB may be minimized.

The network that determines to do the proxy operation between the first UE and the second UE (or the network that identifies that the proxy operation between the first UE and the second UE is determined) may select an appropriate cell for the proxy operation. In this case, for example, the network may select an optimal serving cell by reference to the information included in the proxy operation performance request message described above, the measurement report transmitted by the second UE, the R-PLMN and/or Selected PLMN of the first UE and the second UE, and the like.

When a cell for the proxy operation is determined, the network may command the first UE to perform handover or cell reselection and make the first UE move to the corresponding cell, and may also command the second UE to perform handover and to move to the corresponding cell. Through this, the first UE and the second UE may be connected with the same PLMN/MME and the same serving cell.

Later, a message information forwarding interface is setup between the first UE and the second UE (step, S1350).

More particularly, to the second UE that provides the proxy operation service to the first UE, an additional radio bearer (i.e., a radio bearer for transmitting traffic accompanied by the proxy operation) may be configured. The configuration for an additional radio bearer between the second UEs may also be based on an RRC message received from the network. According to a network configuration, the additional radio bearer may be configured dedicated to the proxy operation but may also be configured so as to be used for a transmission of data traffic of the second UE. The network may reconfigure a specific bearer among the pre-configured radio bearers so as to transmit the traffic accompanied by the proxy operation.

Here, the additional radio bearer configuration may be divided into Uu interface between an eNB and a UE and PC5 interface between UEs. The second UE may also construct an additional layer 2 entity and an additional channel (e.g., physical channel, transport channel or logical channel) with respect to each of the additional radio bearer configurations.

For a proxy radio bearer configuration in the Uu interface between an eNB and a UE, the network may also configure an Evolved packet system (EPS) bearer corresponding to the second UE. The EPS bearer is mapped to the proxy radio bearer for the first UE, and the second UE may relay a bearer service corresponding to the first UE by being setup to the second UE. At this point, the CN may identify the proxy radio bearer, that is, the additional radio bearers are associated with the proxy operation of the second UE. In this case, the eNB may notify that the additional radio bearer is the proxy radio bearer to the second UE. The CN may discriminate the priority of the proxy radio bearer and a normal radio bearer. In this case, the discrimination of the priority may be based on the scheme of newly determining a value of QoS Class Identifier (QCI) or Allocation and Retention Priority (ARP) or the scheme of defining new QoS parameter. Alternatively, in order to share the fact that the bearer is the proxy operation service between an MME and an eNB, it may considered to introduce a new flag (may be an indicator constructed as 1 bit) mapped to the bearer configuration information or to perform signaling of the flag between an eNB and an MME.

As described above, in the case that additional radio bearers for the first UE are configured for the second UE, the second UE may notify the radio bearer configuration described above to the first UE, and through this, the first UE may configure an additional radio bearer.

The radio bearer added to the second UE may include a radio bearer constructed in the Uu interface, which is a communication interface between an eNB and a UE and a radio bearer constructed in the inter-UE direct communication interface between the second UE and the first UE. The inter-UE direct communication interface may include an inter-UE direct communication interface based on LTE, that is, PC5 interface (sidelink). In this case, the first UE may configure a Sidelink Radio Bearer for the PC5 interface. Here, when the first UE configures the direct communication link for the proxy operation or the radio bearer for the proxy operation with the second UE, the first UE may release the corresponding radio bearers in the Uu interface. The release of the bearers may be performed by an instruction of an eNB or a determination of the UE itself, after the configuration of the inter-UE direct communication link for the proxy operation or the radio bearer is completed.

In addition, the first UE may transmit UE configuration information of the first UE to the second UE. The configuration information may include a physical layer configuration, a MAC configuration, an RLC configuration and a PDCP configuration of the UE. The second UE that receives the UE configuration information may use the information for performing the proxy operation. For example, in order for the second UE to receive downlink data in place of the first UE and/or to transmit uplink data in place of the first UE, it may be required for the second UE to construct an RLC entity and a PDCP entity of the second UE according to the RLC, PDCP configuration of the first UE.

In order for the second UE to receive downlink data in place of the first UE and/or to transmit uplink data in place of the first UE, it is also available for the second UE to construct an additional MAC entity according to the MAC configuration of the first UE and to construct an additional PHY configuration according to the PHY configuration of the first UE.

Later, the first UE enters a proxy service mode state (step, S1360). The proxy service mode may be referred to as a mode that omits a part or a most part of the procedure performed by a UE in a normal mode. For example, the first UE performs a paging procedure, a scheduling monitoring, a data transmission and reception, and the like in the normal mode, but may not directly perform at least one of the operations in the proxy service mode. In this case, the operation not directly performed by the first UE may be worked by the second UE. Accordingly, the power consumption of the UE in the proxy service mode is smaller than that of the UE in the normal mode, generally. Therefore, the proxy service mode may also be called a power saving mode. Hereinafter, for the convenience of description, the proxy service mode may be referred to as the power saving mode. The power saving mode (i.e., proxy service mode) may be implemented in the form that the second UE acts as a proxy for a part (or the whole) of the procedure for the cellular communication for the first UE or that the first UE omits or perform with a low frequency a part (or the whole) of the procedure for the cellular communication, and the state itself for performing the operation may also be referred to as the power saving mode.

More particularly, the first UE, when the second UE is going to perform the proxy operation procedure for the first UE, may operate in the power saving mode according to an indication of the second UE or an indication of an eNB or an MME. Here, 1) In the case that the first UE is in an RRC connected mode, The UE in the RRC connected state (or mode) may omit or perform with a low frequency the operations that the first UE should perform in the normal RRC connected mode, while the first UE is in the power saving mode (i.e., proxy service mode). For example,

- The first UE may not perform a measurement of a serving cell and/or a neighboring cell, which is required for the mobility support.
- The first UE may omit the measurement report procedure which is required for the mobility support. That is, the UE may omit the evaluation of a measurement report event and the resulted measurement report.
- The first UE may perform a measurement of a serving cell and/or a neighboring cell, which is required for the mobility support with a low frequency in comparison with the second UE.
- The first UE may not perform a control channel monitoring which is required for the mobility support.
- The first UE may perform a control channel monitoring which is required for the mobility support with a low frequency in comparison with the second UE.
- The first UE may not perform a control channel monitoring which is required for downlink scheduling.
- The first UE may omit a paging reception for maintaining an SIB as the latest state in the connected mode.
- The first UE may omit a paging reception for receiving an urgent message in the connected mode.
- The first UE may omit a Radio Link Monitoring (RLM) procedure for determining that a use of the RRC connection is usable.

2) In the case that the first UE is in an RRC idle mode,

The UE in the RRC idle mode may omit or perform with a low frequency the operations that the first UE should perform in the normal RRC idle mode, while the first UE is in the power saving mode. For example,

- The first UE may not perform a measurement of a serving cell and/or a neighboring cell, which is required for the mobility support.
- The first UE may perform a measurement of a serving cell and/or a neighboring cell, which is required for the mobility support with a low frequency in comparison with the second UE.
- The first UE may omit an evaluation of cell selection/cell reselection which is required for the mobility support and the consequential cell selection/cell reselection.
- The first UE may omit a paging reception for maintaining an SIB as the latest state in the idle mode.
- The first UE may omit a paging reception for receiving a disaster message (e.g., ETWS, commercial mobile alert system (CMAS) and Korean Public Alert System (KPAS)) in the idle mode.

In addition, while the first UE is in the power saving mode, the first UE may be switched from the RRC connected mode to the RRC idle mode, may operate in the power saving mode, or may monitor a downlink channel according to the 'Extended DRX cycle' which is more extended than the Discontinuous Reception (DRX) cycle which is currently configured.

For the power saving mode operation of the first UE, a network may transmit an RRC message to the first UE and the second UE, and may configure the following parameter values. In this case, the network may transmit the RRC message directly to the first UE or may transmit the RRC message to the first UE through the second UE.

Timer value for the power saving mode: In the case of receiving the parameter value from the network, the first UE may start the timer when receiving the power saving mode, and may be switched from the power saving mode to the normal mode when the timer expires. The second UE may also drive the timer, and may determine whether the first UE is in the power saving mode. For example, in the case that the first UE enters the power saving mode, the second UE may start the timer which is the same as the timer started in the first UE. Later, when the timer in the second UE expires, the second UE may determine the timer of the first UE to be expired too. Accordingly, the second UE may also determine whether the first UE enters the normal mode from the power saving mode. In the case that the first UE does not receive the parameter value from the network, the first UE (or the second UE) may setup the timer value as being infinite. In this case, the first UE may maintain the power saving mode until receiving a separate information (or message).

Paging DRX cycle in the power saving mode: In the case of receiving the parameter value from the network, the first UE may monitor paging according to the parameter value when the first UE in the RRC idle state enters the power saving mode.

Long/short DRX cycle in the power saving mode: In the case of receiving the parameter value from the network, the first UE may perform the DRX according to the parameter value when the first UE in the RRC connected state enters the power saving mode.

Configuration and specific parameter indicating the procedure that the first UE should perform even after entering the power saving mode, or the procedure that the first UE may omit or perform in a low frequency.

Figure 14:
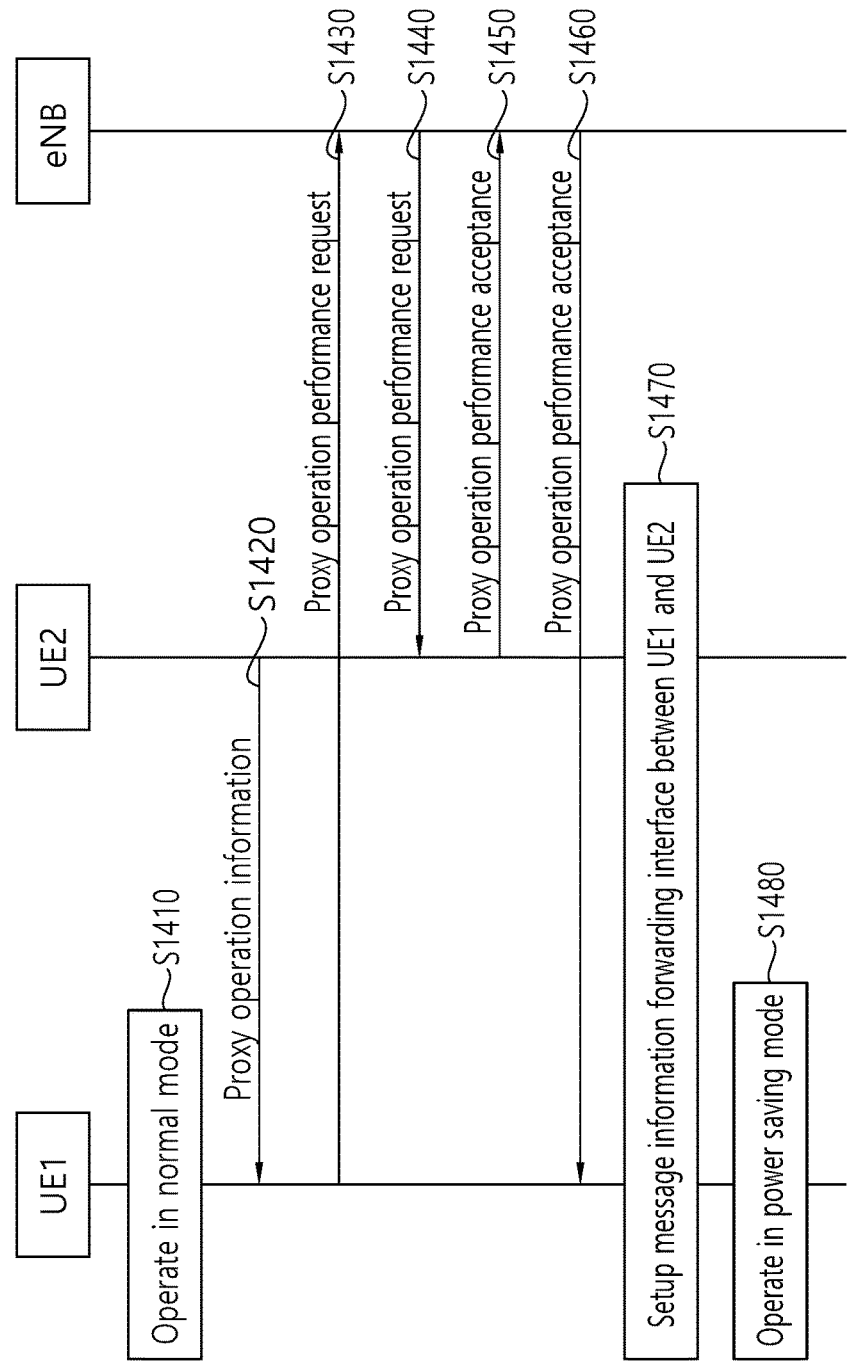
FIG. 14 is a flowchart for a procedure of determining a proxy-operation performance according to another embodiment of the present invention.

FIG. 14 is a flowchart for a procedure of determining a proxy-operation performance according to another embodiment of the present invention.

Referring to FIG. 14, a first UE operates in a normal mode (step, S1410). As described above, the fact that the first UE operates in a normal mode may mean that the first UE is on performing a general procedure for the cellular communication (e.g., mobility procedure, paging procedure, handover procedure, scheduling procedure, etc.).

The second UE may broadcast the proxy operation information to at least one neighboring UE or may transmit the proxy operation information to a specific (or appointed) UE such as the first UE (step, S1420). In this case, the details that the first UE receives the proxy operation information from the second UE are as described above.

After the first UE receives the proxy operation information from the second UE, or after the first UE itself determines even in the case that the first UE does not receive the proxy operation information from the second UE, the first UE may transmit a request message for the proxy operation performance to an eNB (step, S1430).

Later, the eNB transmits a proxy operation performance request message to the second UE (step, S1440).

In response to the proxy operation performance request, the second UE transmits a proxy operation performance acceptance message with the information of a message information forwarding interface between UEs to the eNB (step, S1450).

Later, the eNB transmits a proxy operation performance acceptance message with the information of a message information forwarding interface between UEs (step, S1460).

As described above, when the proxy operation performance is determined through signaling between UEs, a UE (i.e., the first UE or the second UE) among the UEs associated with the proxy operation may notify that the performance of the proxy operation is determined to the eNB, and the detailed examples of the notification that the performance of the proxy operation is determined to the eNB are as described above.

Later, a message/data information forwarding interface is setup between the first UE and the second UE (step, S1470). In this case, the detailed examples of the message/data information forwarding interface setup between the first UE and the second UE are as described above.

Later, the first UE enters the state of saving power, that is, operates in the power saving mode (step, S1480). Here, the detailed examples of the power saving mode are as described above.

Figure 15:
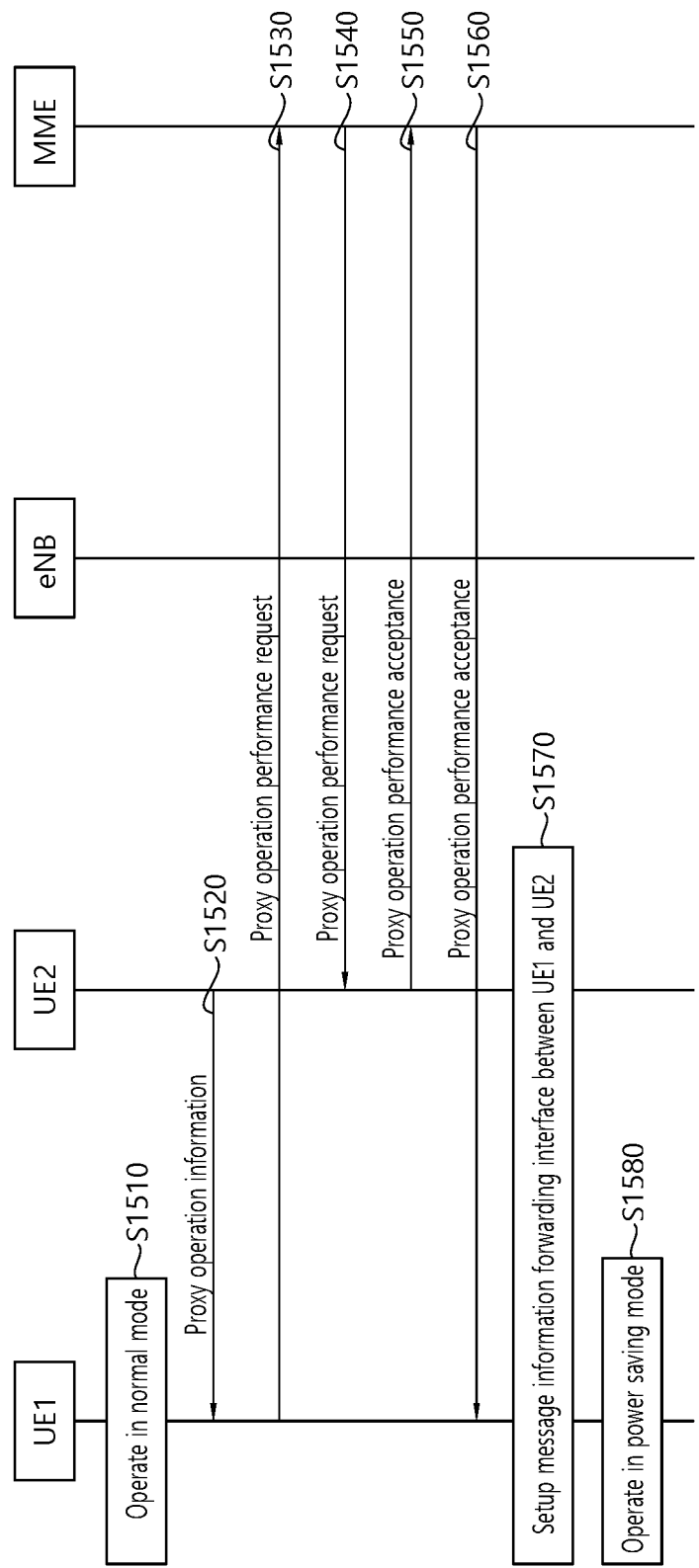
FIG. 15 is a flowchart for a procedure of determining a proxy-operation performance according to still another embodiment of the present invention.

FIG. 15 is a flowchart for a procedure of determining a proxy-operation performance according to still another embodiment of the present invention.

Referring to FIG. 15, a first UE operates in a normal mode (step, S1510). As described above, the fact that the first UE operates in a normal mode may mean that the first UE is on performing a general procedure for the cellular communication (e.g., mobility procedure, paging procedure, handover procedure, scheduling procedure, etc.).

The second UE may broadcast the proxy operation information to at least one neighboring UE or may transmit the proxy operation information to a specific (or appointed) UE such as the first UE (step, S1520). In this case, the details that the first UE receives the proxy operation information from the second UE are as described above.

After the first UE receives the proxy operation information, or after the first UE itself determines even in the case that the first UE does not receive the proxy operation information, the first UE may transmit a request message for the proxy operation performance to a network node (e.g., a proxy operation service server or an MME) (step, S1530).

Later, the network node transmits a proxy operation performance request message to the second UE (step, S1540).

In response to the proxy operation performance request, the second UE transmits a proxy operation performance acceptance message with the information of a message information forwarding interface between UEs (step, S1550).

Later, the network node transmits a proxy operation performance acceptance message with the information of a message information forwarding interface between UEs (step, S1560).

As described above, when the proxy operation performance is determined through signaling between UEs, a UE (i.e., the first UE or the second UE) among the UEs associated with the proxy operation may notify that the performance of the proxy operation is determined to the eNB, and the detailed examples of the notification that the performance of the proxy operation is determined to the eNB are as described above.

Later, a message information forwarding interface is setup between the first UE and the second UE (step, S1570). In this case, the detailed examples of the message information forwarding interface setup between the first UE and the second UE are as described above.

Later, the first UE enters the state of saving power, that is, operates in the power saving mode (step, S1580). Here, the detailed examples of the power saving mode are as described above.

Figure 16:
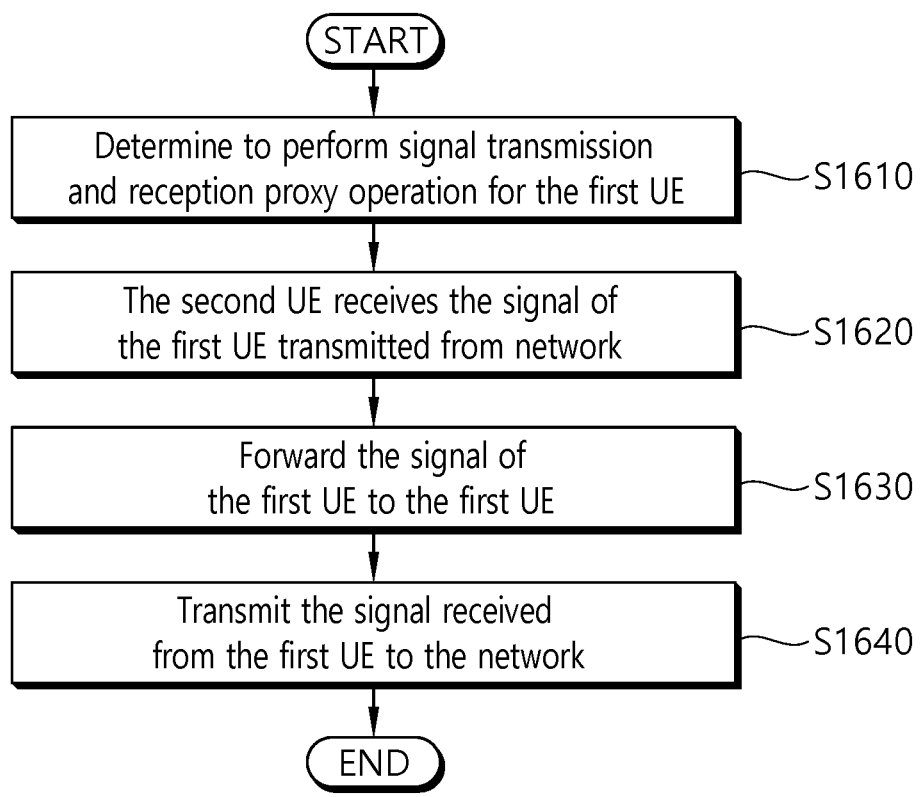
FIG. 16 illustrates a communication method performed by the second UE according to an embodiment of the present invention.

FIG. 16 illustrates a communication method performed by the second UE according to an embodiment of the present invention.

Referring to FIG. 16, the second UE may determine to perform a signal transmission and reception proxy operation for the first UE (step, S1610). The determination procedure is as described above with reference to FIG. 13 to FIG. 15.

The second UE receives the signal of the first UE transmitted from a network (step, S1620).

The second UE forwards the signal of the first UE to the first UE (step, S1630).

The second UE transmits the signal received from the first UE to the network (step, S1640).

Referring to FIG. 16, the second UE may monitor the control information that the network transmits to the first UE. In addition, the second UE may receive the data that the network transmits to the first UE. In this case, the control information that the network transmits to the first UE may be identified by an identifier of the first UE. For example, the control that the network transmits to the first UE may be monitored in a search space indicated by the identifier of the first UE. That is, the second UE monitors the control information transmitted to the first UE using the identifier of the first UE. In order to enable this, the second UE may receive the identifier of the first UE from the network or the first UE in advance.

Alternatively, the control information that the network transmits to the first UE may be identified by an identifier of the second UE. In this case, the control information that the network transmits to the first UE may include a field representing that the control information is with respect to the first UE.

In the case that the second UE receives the data that the network transmits to the first UE, the second UE may forward the data to the first UE. The data may be either one of a higher layer message transmitted through a signaling radio bearer (SRB) and a user data transmitted through a data radio bearer (DRB).

The second UE may provide the information representing whether the data is a higher layer message transmitted through an SRB and a user data transmitted through a DRB to the first UE.

Using the uplink resource allocated to the first UE by the network, the second UE may transmit the uplink data of the first UE.

The second UE may request the uplink resource for the first UE to the network, and may transmit the uplink data of the first UE using the uplink resource allocated from the network by the request.

In the case that the second UE determines to act as a proxy for the signal transmission and reception of the first UE, the first UE may operate in the power saving mode. In the power saving mode, the first UE may not perform a measurement of a serving cell and a neighboring cell which is required for performing a procedure in relation to the mobility, may perform the measurement of a serving cell and a neighboring cell which is required for performing a procedure in relation to the mobility with a lower frequency than the second UE, may omit a paging reception, or may perform the paging reception with a lower frequency than the second UE. The second UE may be a UE of which battery capacity is greater than that of the first UE.

The second UE may receive the configuration information of the first UE from the first UE, and may act as a proxy for the signal transmission and reception of the first UE based on the configuration information.

Now, each step of the FIG. 16 will be described in detail.

Assuming the case that the second UE determines to perform a proxy operation, that is, to receive a signal for the first UE in place of the first UE, the second UE may monitor a downlink control channel that the network is going to transmit to the first UE. The downlink control channel may be a physical downlink control channel (PDCCH), for example.

One of the following methods may be used for the second UE to monitor the downlink control channel for scheduling of the first UE.

First, the second UE may monitor the downlink control channel of the first UE using its own identifier. In the case that the downlink control channel is for downlink scheduling (e.g., PDCCH), the eNB may perform the downlink scheduling of the first UE using the identifier of the second UE. For example, a PDCCH for a specific UE may include an identifier of the specific UE, for example, downlink control information (DCI) to which Cyclic Redundancy Check (CRC) masked by a cell-Radio Network Temporary Identifier (C-RNTI) is added. The eNB may add the masked CRC as an identifier of the second UE to the DCI included in the PDCCH for the first UE. The PDCCH for the first UE (more particularly, a DCI for the first UE) may not include a separate field representing that the PDCCH is for scheduling of the first UE. A physical layer (PHY) of the second UE may operate by identifying that the scheduling for the first UE is the scheduling for the second UE. According to the first method, there is an advantage that a change of layer 1 (PHY) of the second UE is minimized.

Second, the second UE may monitor the downlink control channel of the first UE using an identifier of the first UE. In this method, the eNB perform downlink scheduling of the first UE using the identifier of the first UE.

Particularly, the second UE monitors a UE-specific search space set to the first UE in addition to the common search space. In addition, the second UE monitors the PDCCH distinguished by an identifier (e.g., C-RNTI) of the first UE.

In addition, the second UE may give higher priority for monitoring the PDCCH for the second UE itself than for monitoring the PDCCH for the first UE, or on the contrary, may give higher priority for monitoring the PDCCH for the first UE than for monitoring the PDCCH for the second UE itself. The priority for monitoring the PDCCH may be determined according to the priority determined between the first and second UEs or the priority of the service provided by the first and second UEs.

Third, the second UE may monitor the downlink control channel of the first UE using its own identifier, but uses a field representing that it is the downlink control channel of the first UE. In the case of using this method, the eNB performs downlink scheduling using the identifier of the second UE, but adds a field representing that the PDCCH (more particularly, a DCI for the first UE) is for the first UE in the PDCCH for the first UE. The field may indicate an index for the first UE or an ID of the first UE. After the second UE detects the PDCCH for the first UE using its own C-RNTI, the second UE may distinguish whether the PDCCH is for the first UE or the second UE through the field. This method may be called cross-UE scheduling.

In addition, the second UE determines to perform a proxy operation, that is, to receive a signal for the first UE in place of the first UE, the second UE may monitor a data channel that the network is going to transmit to the first UE. The data channel may be a physical downlink shared channel (PDSCH).

The eNB, the first UE and the second UE may setup a proxy radio bearer for the proxy operation. The proxy radio bearer may be divided into a signaling radio bearer (SRB) and a data radio bearer (DRB), and separate SRB and DRB may be setup for the proxy operation. The separate SRB and DRB may be distinguished in Layer 2 by being distinguished through a separate logical channel identity (LCID) reserved for a use of the proxy radio bearer or including a new field indicating that a MAC SDU is the data corresponding to the proxy radio bearer in a MAC subheader.

When the second UE performs a Logical Channel Prioritization for multiplexing a logical channel in an uplink transmission, the eNB, the first UE and the second UE may give a specific priority for the proxy radio bearer. For example, the proxy signaling radio bearer (Proxy SRB) may have lower priority than the existing SRB0, SRB1 and SRB2 or may be setup as the priority as the same as SRB2 (priority of SRB2 is lower than that of SRB1 and SRB0). When the proxy SRB is generated, the second UE may determine the priority of the Proxy SRB autonomously. As another example, the proxy signaling radio bearer (Proxy SRB) may have the priority such as the lowest priority among the existing DRBs or may have a specific lower priority than the priority of the existing DRBs. Basically, the priority of the Proxy DRB also follows the priority value indicated by a network like other DRBs. The eNB may differently setup the priority of the logical channels such that the first and second UEs may process the separate radio bearers by discriminating the priority of the existing radio bearers.

In the case that the second UE acts as a proxy for a data reception of the first UE, the second UE may act as a proxy for the PHY, MAC, RLC and PDCP operations that the first UE should perform when the first UE directly receives data from the eNB. The second UE may receive a data channel for the first UE using a required configuration among the PHY, MAC, RLC and PDCP of the first UE. The second UE may operate as if the configuration required for the operation required for receiving data among the PHY, MAC, RLC and PDCP configurations of the first UE is configured by receiving from the eNB. That is, the second UE operates as if it is the first UE.

Or, in the case that the second UE acts as a proxy for a data reception of the first UE, the second UE performs the proxy operation (acts as a proxy for the data reception) according to the PHY, MAC, RLC and PDCP configurations that may be used in the proxy operation, and performs the PHY, MAC, RLC and PDCP operations according to it.

Now, the process (step, S1630) will be described for forwarding a signal to the first UE by the second UE that receives the signal for the first UE in place of the first UE in FIG. 16.

In the case that the second UE performing the proxy operation receives the data that should transmitted to the first UE from the network, the second UE may transmit the data to the first UE. The data that the second UE transmits to the first UE may be an RRC message transmitted through an SRB. Or, the data that the second UE transmits to the first UE may be a user data (IP packet) transmitted through a DRB.

The data may be transmitted to the first UE directly from the second UE through an inter-UE direct communication link (i.e., using D2D communication) or may be transmitted through other communication node. For example, the data may be transmitted using a communication technique that may perform the information transmission between UEs with low power such as an inter-UE direct communication link using Wi-Fi, a communication link between UEs using Bluetooth or a direct communication link between UEs using LTE/LTE-A.

The data transmitted to the second UE through an inter-UE direct link for the purpose of transmitting data to the network by the first UE may be a MAC PDU, a RLC PDU, a PDCP PDU, or a PDU of PDCP higher layer (e.g., IP layer) of the first UE. When the second UE receives the data through the inter-UE direct link, the second UE determines to perform an uplink transmission by performing an additional a second sublayer processing by treating the data as an SDU of the second sublayer in the second UE depending on the fact that the received data is a PDU of a certain second sublayer.

Figure 17:
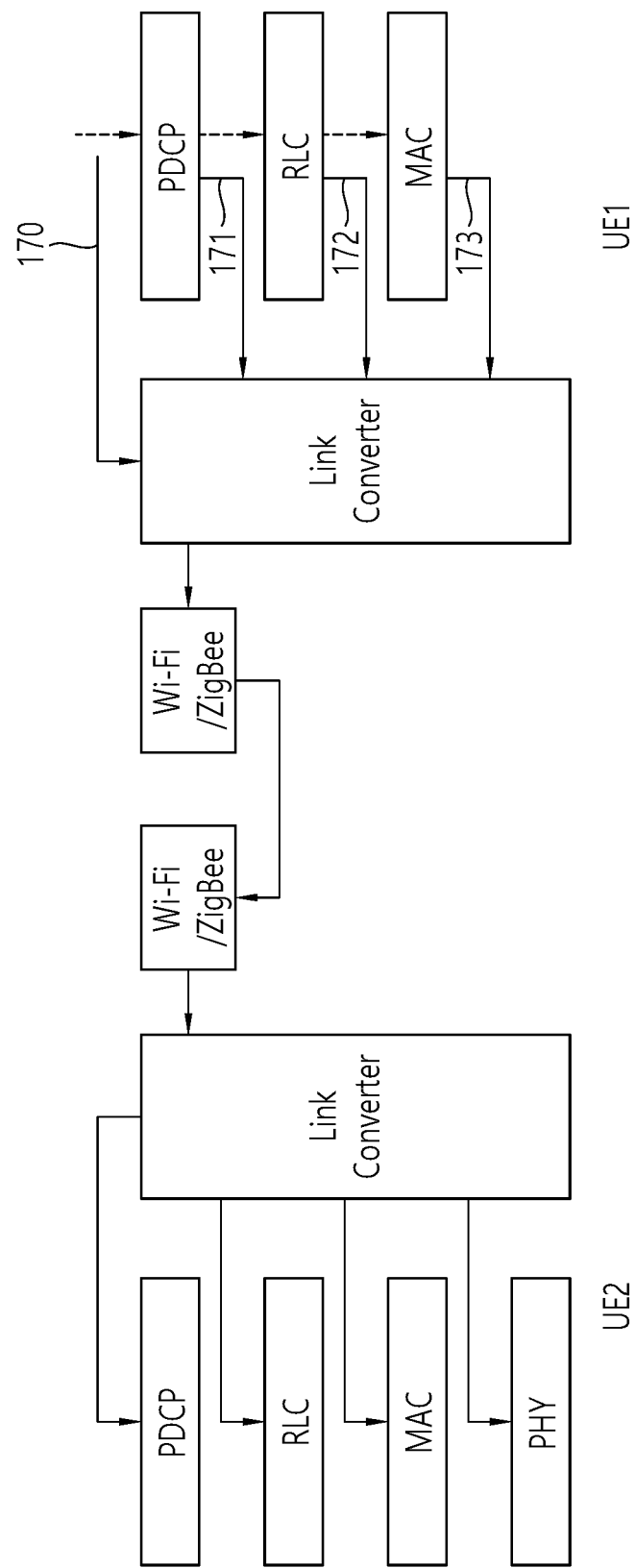
FIG. 17 illustrates an example of transmitting data to the second UE by the first UE.

FIG. 17 illustrates an example of transmitting data to the second UE by the first UE.

The data that the first UE (UE1) transmits to the second UE (UE2) may be the data that the first UE is going to transmit to a network. The first UE may transmit data to the second UE through the inter-UE direct link such as Wi-Fi, ZigBee, Bluetooth, sidelink provided in LTE-A (ProSe), and the like. The first UE may transmit the data processed only to a specific layer among its own protocol layers to the second UE. For example, the first UE may transmit the MAC PDU 173 that is the data processed up to MAC layer, the RLC PDU 172 processed up to RLC layer, PDCP PDU 171 processed up to PDCP layer or higher layer PDU 170 processed up to PDCH higher layer (e.g., IP layer) to the second UE.

The second UE that receives the data from the first UE may consider the layer in which the received data is processed. And after processing the next layer, second UE may transmit the data to the network. For example, when receiving a MAC PDU from the first UE, the second UE may transmit the data after performing an additional processing the data in PHY layer. When receiving a RLC PDU from the first UE, the second UE may transmit the data after performing an additional processing the data in MAC and PHY layer sequentially.

Meanwhile, when the first UE forwards the data to the second UE, a link converter may add a control field that indicates a type of the data to the data forwarded through the inter-UE direct link.

Figure 18:
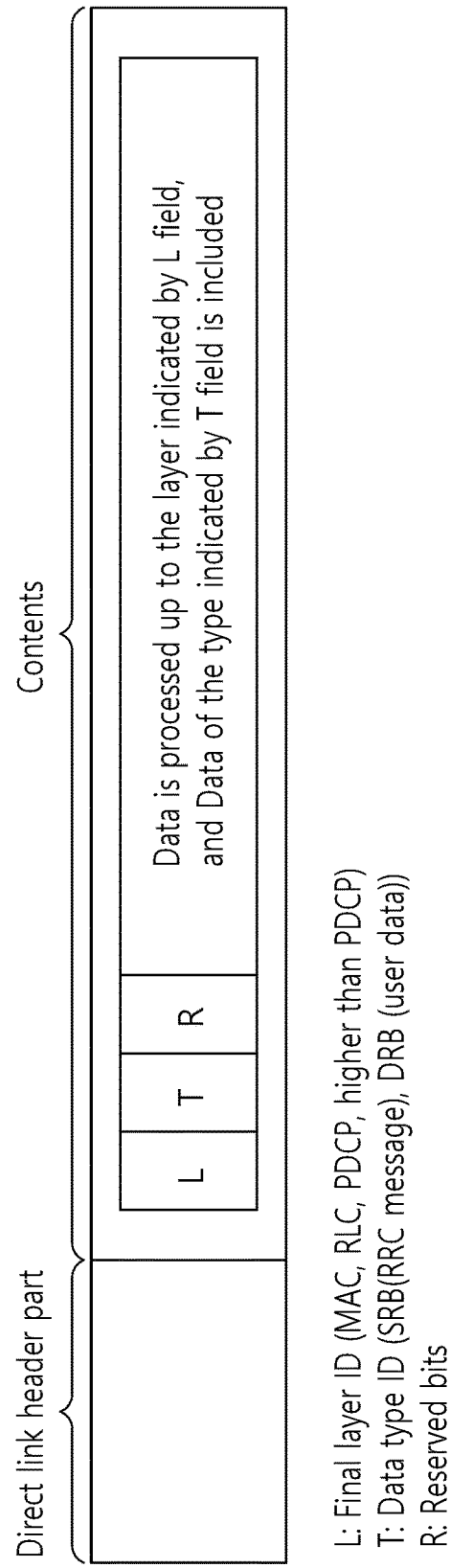
FIG. 18 illustrates an example of a protocol data unit (PDU) format available to be used in an inter-UE direct link.

FIG. 18 illustrates an example of a protocol data unit (PDU) format available to be used in an inter-UE direct link.

Referring to FIG. 18, the data forwarded through an inter-UE direct link may include a direct link header and contents. The contents part may include the information (field) indicating that the data is a PDU of a certain L2 sublayer and/or the information (field) indicating a type of the forwarded data. For example, the contents may include fields indicated by L and T. The field indicated by L is the information indicating that the data is a PDU of a certain L2 sublayer, and may indicate whether the data is a MAC PDU, a RLC PDU, a PDCP PDU or a PDU of PDCP higher layer (e.g., IP). The field indicated by T may include the information indicating a type of the data. The information may indicate whether the data is a data transmitted through an SRB/control data or a user data transmitted through a DRB. The R field may indicate whether the data includes a specific MAC CE or at least one MAC CE. Or, the R field may indicate whether the data includes a specific RLC control PDU or at least one RLC control PDU. Or, the R field may indicate whether the data includes a specific PDCP control PDU or at least one PDCP control PDU.

In order to act as a proxy for the transmission of the first UE, the link converter of the second UE that receives the data from the first UE through the inter-UE direct link identifies that the received data is a PDU of a certain second sublayer, and determines to send the received data to the second sublayer based on it. For example, when the received data is a MAC PDU, this is sent to PHY, and when the received data is an RLC PDU, this is sent to MAC. In addition, when the received data is a PDCP PDU, this is sent to RLC, and when the received data is a PDU of PDCP higher layer, this is sent to PDCP. The link converter of the second UE may identify the T control field, and may determine through which radio bearer the received data is transmitted (in the case that the received data is a PDCP PDU) or through which logical channel the received data is transmitted (in the case that the received data is an RLC PDU), and so on. The network may indicate what PDU of layer/sublayer is transmitted to the first UE and the second UE in advance.

The link converter of the second UE a transmittable transport block in an aspect of MAC of the second UE aspect to the RLC sublayer of the second UE through the link converter of the first UE. Based on the information, the RLC sublayer of the second UE may perform a repartition of an RLC PDU.

Meanwhile, the ACK/NACK of an eNB for a data transmission of the first UE that the second UE acts as a proxy for may be forwarded to the first UE. For example, when the first UE generates an RLC PDU and transmits it to the second UE, and accordingly, the second UE transmits the data to the eNB and receives a RLC STATUS REPORT meaning an ACK for it, the second UE may notify that the RLC PDU transmission of the first UE is succeeded by transmitting an RLC control PDU meaning an ACK for the RLC PDU. For this, the link converter may setup a sequence number (SN) field to a value (i.e., an SN value of the ACK corresponding to an SN of the RLC PDU that the first UE transmits to the second UE) that the first UE is expected to receive. As another method of forwarding the ACK/NACK of the eNB for the data transmission of the first UE that the second UE acts as a proxy for the RLC STATUS PDU, when the second UE receives an RLC PDU from the first UE, the method is applicable that the second UE transmits an RLC control PDU meaning an ACK to the first UE first, and the second UE guarantees a successful transmission of the RLC PDU. In this paragraph, the example of the feedback (ACK/NACK) to the RLC layer is described, but the method may also be applied to the feedback in other layer like PDCP, MAC, and so on.

Using the R field, it may be indicated whether the data includes a specific MAC CE or at least one MAC CE. Similarly, using the R field, it may be indicated whether the data includes a specific RLC control PDU or at least one RLC control PDU. Similarly, using the R field, it may be indicated whether the data includes a specific PDCP control PDU or at least one PDCP control PDU. Using the R field, it may be indicated whether the MAC PDU includes the data (e.g., VoIP) for a real time service which is sensitive to latency or includes only the data (internet traffic) which is not sensitive to latency relatively, not including the data (e.g., VoIP) for a real time service which is sensitive to latency.

In the case that the inter-UE direct link is the direct communication link (sidelink) based on LTE, the L and T fields may be included in the MAC header of the Sidelink MAC PDU. In this case, the L field may be setup as a MAC PDU always.

Meanwhile, it is available that the first UE separately generates a MAC control element (CE) and transmits it to the second UE through the inter-UE direct link. The second UE that receives it transmits it to the eNB. When constructing a MAC PDU including the MAC CE, the second UE may indicate that the MAC CE is a MAC CE that another UE is going to transmit through a specific field of the header of the MAC PDU or introducing a new field, or through a specific field in the MAC CE part or introducing a new field. For example, the second UE may indicate that the MAC PDU includes an identifier of the first UE or the MAC CE is a MAC CE of another UE, that is, a MAC CE for proxy transmission.

The case will be described that the second UE acts as a proxy for a data reception of the first UE. 1) It is available to transmit an SDU processed up to a specific sublayer of the second UE to the first UE and to make the first UE perform a post process. 2) As another method, it is available that after the second UE constructs up to a PDCP SDU, the second UE transmits it to the first UE. Even in this case, the function of a data format or a link converter defined in the inter-UE direct link described above is applied. However, When the received data is a MAC SDU in the aspect of the first UE, the data is transmitted to an RLC, when the received data is an RLC SDU, the data is transmitted to a PDCP, and when the received data is a PDCP SDU, it is forwarded to a higher layer (e.g., IP layer). It may be indicated which method is to be used among the two methods by the network to the UE.

Reference to FIG. 16 again, a procedure (step, S1640) will be described for transmitting a signal received from the first UE to the second UE in FIG. 16.

In the case that the second UE that determines to perform the proxy operation receives the data to be transmitted from the first UE to the network, the second UE request an uplink transport resource for the data transmission to the eNB.

The second UE may perform the uplink resource request for the data transmission through a scheduling request (RS) resource which is dedicated to the first UE. For example, the second UE may transmit the scheduling request through a PUCCH configured for each UE according to the configuration of the eNB.

Alternatively, the second UE may perform the uplink resource request for the data transmission through a scheduling request resource which is dedicated to the second UE. For example, the second UE does not setup a separate PUCCH for each UE, but may transmit the scheduling request of the first UE through the PUCCH.

Or, the second UE may also perform the uplink resource request for the data transmission through a random access procedure. For example, the second UE may perform the scheduling request for being allocated with the uplink resource from the network through the random access procedure in order to act as a proxy for the uplink transmission operation of the first UE. In this case, the second UE may perform a contention resolution using a UE ID of the first UE during the random access procedure. The eNB may allocate a separate random access preamble group for the proxy operation like the scheduling request transmission and the like described above. In this case, the second UE uses the separate random access preamble during the random access procedure for the proxy of the uplink transmission operation of the first UE. Through a configuration of a serving cell, the second UE may construct a PUCCH channel for itself and a PUCCH channel for the first UE separately, and may transmit by separately constructing scheduling request/HARQ feedback/CSI and the like for the second UE and scheduling request/HARQ feedback/CSI and the like for the first UE.

In order to act as a proxy for a buffer status report of the first UE, the second UE may induce the buffer status report distinguished for each UE and transmit it.

In addition, the random access procedure may be operated in parallel by distinguishing it for each UE.

In the case that the second UE determines to perform the proxy operation, for example, in the case that the second UE determines to transmit the data that is going to be transmitted to the network by the first UE in place of the first UE, the second UE may receive the scheduling information for the data transmission of the first UE from the first UE, and may transmit the data that the first UE is going to transmit to the network through the uplink data channel which is determined based on the scheduling information. The uplink data channel may be a physical uplink shared channel (PUSCH).

In the case that the second UE acts as a proxy for the data transmission of the first UE, the second UE may act as a proxy for the PHY, MAC, RLC and PDCP operations that are performed when the first UE is going to transmit data to the eNB. The second UE may transmit data using a required configuration among the PHY, MAC, RLC and PDCP of the first UE.

Alternatively, in the case that the second UE acts as a proxy for the data transmission of the first UE, the second UE may perform the proxy transmission operation and the PHY, MAC, RLC and PDCP operations according to it according to at least one configuration of PHY, MAC, RLC and PDCP that may be used when performing the proxy operation.

Meanwhile, the second UE may receive a BSR of the first UE for an uplink transmission from the first UE. The second UE may identify the BSR of the first UE as an uplink buffer status of a proxy radio bearer. The BSR may be forwarded to the eNB through a PUSCH.

The second UE may designate the proxy radio bearer as a separate logical channel group (LCG) according to the indication of the eNB, and may process the buffer status of the first UE to be the buffer status of the LCG.

Alternatively, the second UE may construct a proxy buffer status report MAC control element including the buffer status of the first UE. The proxy buffer status report may be processed by being distinguished from the existing BSR that includes the buffer status of the second UE only. In order to indicate to which UE the BSR is related, the second UE may include the a UE identifier in the BSR or may include the information indicating that it is the proxy operation buffer status report in the buffer status report MAC CE or the corresponding MAC header.

The eNB may allocate an uplink grant of the second UE as follows according to the scheduling request and the BSR received from the second UE.

The eNB may allocate an uplink grant without distinguishing the uplink grant for the uplink data of the first UE and the uplink grant for the uplink data of the second UE. In this case, in the uplink grant identified by an identifier (e.g., RNTI) of the second UE, both of the uplink grant for the uplink data of the first UE and the uplink grant for the uplink data of the second UE are included. The second UE monitors the RNTI of the second UE only.

Otherwise, the eNB may allocate an uplink grant by distinguishing the uplink grant for the uplink data of the first UE and the uplink grant for the uplink data of the second UE. In this case, the uplink grant identified by an identifier (e.g., RNTI) of the first UE is distinguished from the uplink grant identified by an identifier of the second UE. The second UE monitors both of the RNTI of the first UE and the RNTI of the second UE.

For the uplink transmission, the second UE may apply the priority as follows.

The BSR of the first UE has lower priority than the MAC control element (C-RNTI, BSR and PHR) and the uplink control channel data. Alternatively, the BSR of the first UE has the same priority as the BSR of the second UE.

The BSR of the first UE has higher priority than the data of the second UE.

The BSR of the first UE has higher priority than the padding BSR of the second UE.

The data of the first UE has a priority lower than or the same as the data of the second UE.

The data of the first UE has a priority higher than or the same as the data of the second UE.

Figure 19:
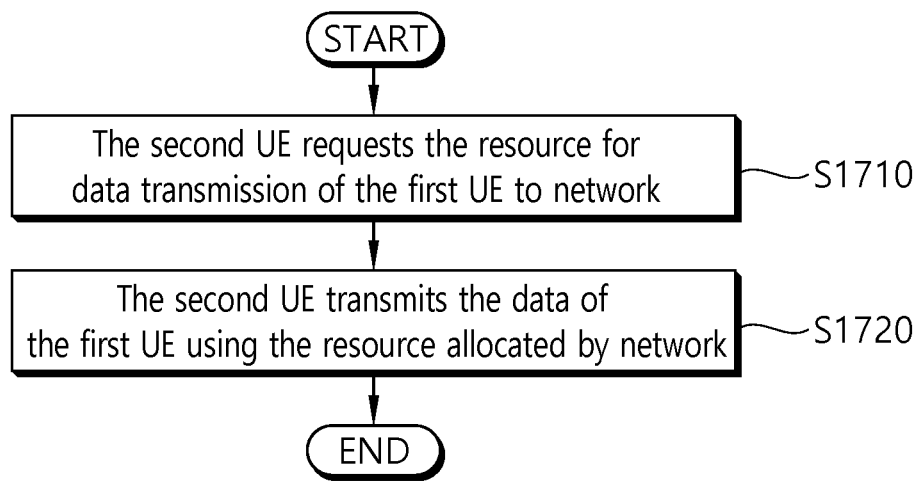
FIG. 19 illustrates an operation method for a proxy transmission of the second UE.

FIG. 19 illustrates an operation method for a proxy transmission of the second UE.

Referring to FIG. 19, the second UE requests the resource for a data transmission of the first UE in a network (step, S1710). The data of the first UE may be a user data induced from the first UE or a control data like a response to the RRC message received from the network, and so on.

The second UE transmits the data of the first UE in place of the first UE using the resource allocated by the network (step, S1720). After being allocated with the resource from the network in response to the response to the request, the second UE may transmit the data of the first UE using the allocated resource.

Figure 20:
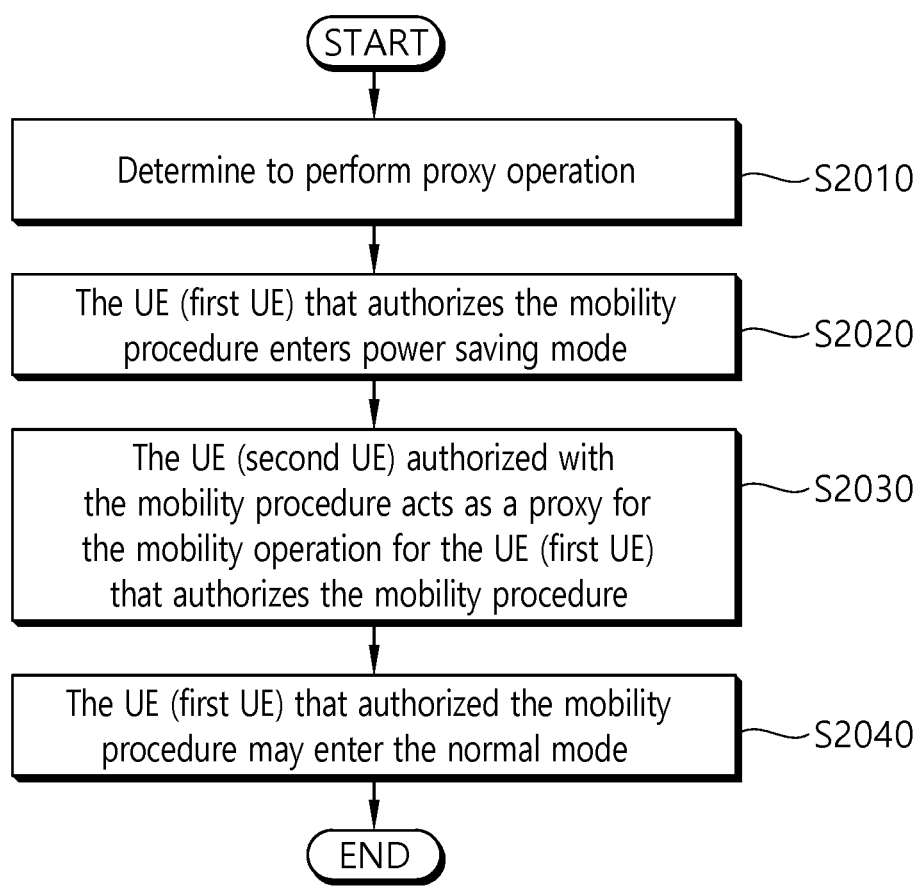
FIG. 20 is a flowchart for a method for acting as a proxy for the mobility operation according to an embodiment of the present invention.

FIG. 20 is a flowchart for a method for acting as a proxy for the mobility operation according to an embodiment of the present invention.

Referring to FIG. 20, a UE (e.g., the first UE) among a plurality of UEs (e.g., the first UE and the second UE) may determine to perform a proxy operation (step, S2010). In this case, the detailed example of the procedure of determining to perform the proxy operation is as described above. Hereinafter, among the procedures of determining to perform the proxy operation, particularly, the procedure of negotiating to provide the proxy service of the mobility operation with each other will be described.

Here, the proxy service of the mobility operation may be intended to omit or decrease the procedure in relation to the mobility for a UE (e.g., the first UE) provided with the service. In this case, the UE provided with the service may be in the RRC idle state. Hereinafter, for the convenience of description, "proxy service of the mobility operation", "mobility proxy service", "acting as a proxy for the procedure in relation to the mobility" or "mobility management procedure" and the like are described with being mixed. All of those expression may mean that another UE performs the proxy operation, particularly, the operation in relation to the mobility.

More particularly, any one UE (e.g., the second UE) determines to act as a proxy for a procedure required for a mobility management, that is, a mobility operation of other UE (e.g., the first UE). As a result, it may be regarded that the other UE (e.g., the first UE) authorizes the one UE (the second UE) with the mobility management procedure. According to the procedure, the one UE (the second UE) determines the mobility proxy service for the other UE (the first UE), and the one UE (the second UE) performs the procedure according to the mobility proxy service provision. Hereinafter, this may be referred to as the one UE (e.g., the second UE) performs the mobility proxy procedure for the other UE (the first UE). In this case, the UE (the first UE) that authorizes the proxy of the mobility procedure may be in an RRC idle state. Here, for the convenience of description, it has been described that the second UE acts as a proxy for the mobility operation of the first UE, but the present invention is not intended to exclude the case that the first UE acts as a proxy for the mobility operation of the second UE from the scope.

When determining to provide the mobility proxy service, it may be required that the information indicating the ID of the UE (e.g., the first UE) provided with the service or the paging occasion is forwarded to the UE (e.g., the second UE) that provides the service. That is, the second UE may act as a proxy for the paging reception of the first UE based on the ID of the first UE received from the first UE and/or the information indicating the paging occasion.

One UE (e.g., the first UE or the second UE) between two UEs (e.g., the first UE and the second UE) may notify the information indicating that the mobility proxy is determined between UEs to a network. That is, the information indicating that any one UE is to act as a proxy for the mobility procedure of another UE is provided to the network. For example, the UE (e.g., the second UE) that is going to act as a proxy for the mobility procedure may notify that it determines to act as a proxy for the mobility procedure to its own serving cell. As another example, the UE (e.g., the second UE) that is going to act as a proxy for the mobility procedure may notify that it determines to act as a proxy for the mobility procedure of the first UE to its own serving CN (e.g., an MME) through a NAS message.

Later, the UE (e.g., the first UE) that authorizes the mobility procedure enters the power saving mode (step, S2020). In this case, the detailed operation procedure of the UE (e.g., the first UE) that enters the power saving mode is as described above, and only the operation in relation to the mobility proxy procedure of the UE that enters the power saving mode will be described below.

More particularly,

It may be regarded that the first UE authorizes other procedure (e.g., system information monitoring procedure) that is required for the first UE to perform in a serving cell as well as the mobility management procedure to the second UE.

The first UE may not perform the measurement of serving cell/neighboring cell that is required for performing a reselection procedure. As a result, the first UE may omit the performance of the reselection evaluation and the reselection in comparison with the normal operation.

The first UE may perform the measurement of serving cell/neighboring cell that is required for performing a reselection procedure with low frequency. As a result, the first UE may omit the performance of the reselection evaluation and the reselection in comparison with the normal operation.

The first UE may omit the paging reception or may perform the paging reception with low frequency in order to maintain an SIB as being latest.

The first UE may omit the paging reception or may perform the paging reception with low frequency in order to receive an emergency message.

Later, the UE (the second UE) authorized with the mobility procedure acts as a proxy for the mobility operation for the UE (the first UE) that authorizes the mobility procedure (step, S2030).

More particularly, the second UE performs a measurement for its own mobility management. Here, 1) in the case that the second UE is in the RRC idle state, the second UE performs a measurement for a cell selection/reselection. The measurement may include a measurement for a serving cell and/or a neighboring cell. 2) In the case that the second UE may perform a measurement according to a measurement configuration in the case that the second UE is in the RRC connected state. In this case, the measurement may include a measurement for a serving cell and/or a neighboring cell.

When the serving cell of the second UE is changed according to a procedure like the handover, the UE may transmit new serving cell information to the first UE, and the new serving cell information 1) When the serving cell of the second UE is changed, the second UE may transmit the new serving cell information to the first UE as fast as possible (or immediately), and the detailed example that the second UE may transmit the new serving cell information to the first UE as fast as possible (or immediately) will be described below.

2) Even in the case that the serving cell of the second UE is changed, the second UE may not transmit the new serving cell information to the first UE immediately. Instead, in the case that the second UE is requested the new serving cell information from the first UE, the second UE may transmit the new serving cell information to the first UE, and the detailed example that the second UE may transmit the new serving cell information to the first UE in the case that the second UE is requested the new serving cell information from the first UE will be described below.

The serving cell information that the second UE transmits to the first UE may include the following information.

Serving cell identifier (e.g., Physical cell ID, global cell ID),

Serving cell frequency,

System information set 1: System information essential for an RRC connected UE among the serving cell system information, that is, the system information essential for an RRC connection configuration (e.g., MIB, SIB1, SIB2)

System information set 2: System information essential for an RRC idle UE among the serving cell system information (e.g., MIB, SIB1, SIB2, SIB3, SIB4-6 (e.g., SIBs including reselection parameters)

When the second UE forwards the system information to the first UE, one of the following methods may be used: 1) system information 1 and system information set 2 may be transmitted, or 2) only system information set 1 is transmitted.

When the second UE forwards the information to the first UE, the information may be transmitted through an inter-UE direct communication link or other communication link. For example, the data may be transmitted using a communication technique that may perform the information transmission between UEs with low power such as an inter-UE direct communication link using Wi-Fi, a communication link between UEs using Bluetooth or a direct communication link between UEs using LTE.

The UE (the first UE) that authorized the mobility procedure may enter the normal mode (step, S2040). In this case, the detailed procedure for the UE that authorized the mobility procedure to enter the normal mode is as described above, and only the content in relation to the mobility proxy service will be described below.

More particularly, while the first UE is in the power saving mode, in the case that the first UE needs to enter the normal mode since the first UE receives a paging message for the first UE or the mobile originating data is generated, the first UE reconfigures itself (the first UE) by using the serving cell information transmitted by the second UE. In this case, the reconfiguration of the first UE using the received information may similar to the reconfiguration of the UE by receiving the information from an eNB. For example, the first UE performs the operation such as the operation when the UE receives it through MIB and SIB after receiving the information described above from the second UE.

In addition, the first UE may attempt the synchronization process with the indicated serving cell based on the received serving cell information, and the synchronization process may include downlink synchronization. When the UE succeeded the downlink synchronization of the serving cell and succeeded to camp on the serving cell, the UE may trigger an RRC Connection setup procedure for establishing an RRC connection in the corresponding serving cell. In this case, through the procedure described above, uplink synchronization with respect to the serving cell is performed. In addition, it is available for the first UE to notify that the UE gets out of the power saving mode and operates in the normal mode through the random access procedure/RRC connection setup procedure described above to the serving cell.

When the reconfiguration and the downlink synchronization are completed based on the information that the first UE receives from the second UE, the first UE returns to the normal mode. The first UE may notify the fact that the first UE returns to the normal operation mode to the second UE that has been provided the mobility proxy service. After receiving the notification, the second UE may stop providing the mobility proxy service, particularly, the mobility proxy service for the first UE.

The method for acting as a proxy for the mobility operation according to the present invention may be combined with the procedure of acting as a proxy for the paging of the UE that authorizes the mobility proxy of the UE that is authorized with the proxy of the mobility operation. For example, the second UE may be determined to perform the paging operation required for the cellular operation of the first UE. Hereinafter, a procedure for the UE that is authorized with the proxy of the mobility operation to acting as a proxy for the paging of the UE that authorizes the mobility proxy will be described.

Figure 21:
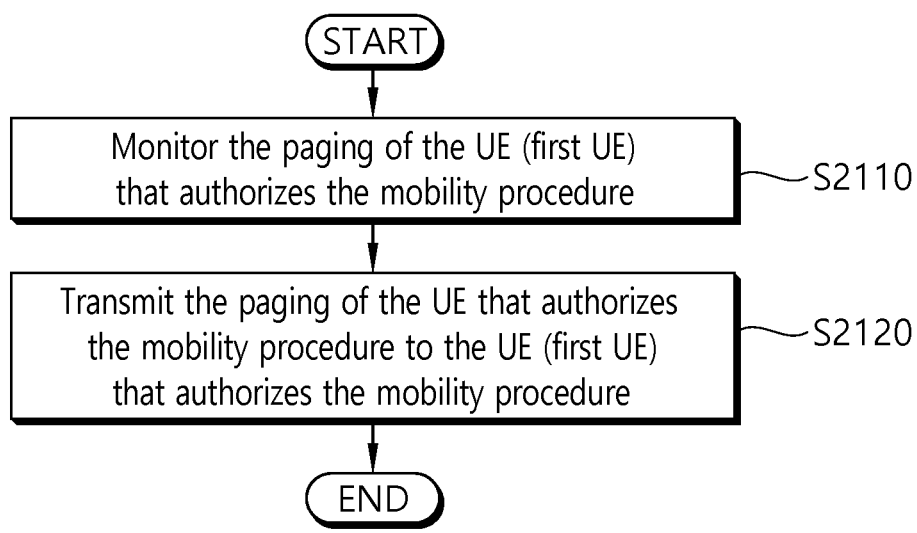
FIG. 21 is a flowchart of a method for acting as a proxy for the paging according to an embodiment of the present invention.

FIG. 21 is a flowchart of a method for acting as a proxy for the paging according to an embodiment of the present invention.

Referring to FIG. 21, A UE (e.g., the second UE) authorized with the mobility procedure may monitor the paging of the UE (e.g., the first UE) that authorizes the mobility procedure (step, S2110).

More particularly, the second UE may monitor the paging on the paging occasion of the first UE additionally in addition to its own paging occasion. Or, the second UE may also monitor the paging for the first UE on its own paging occasion.

Later, the UE (e.g., the second UE) authorized with the mobility procedure may transmit the paging of the UE that authorizes the mobility procedure to the UE (e.g., the first UE) that authorizes the mobility procedure (step, S2120).

More particularly, the second UE identifies that the UE identity of the first UE in addition to its own UE identity in the received paging message. Or, the second UE identifies that the group ID to which the first UE is belonged is included in the received paging message.

In this case, when the second UE receives the paging message including the UE identity of the first UE, the second UE may regard the corresponding paging message is the paging message for the first UE.

In the case that the second UE receives a paging and determines the received paging is a paging message for the first UE, the second UE may notify that the paging is received to the first UE. For this, the second UE may forward the paging message itself to the first UE or may forward only the information (e.g., field(s) included in the paging message) included in the paging message.

When the second UE forwards the fact that the paging is received and/or the information included in the paging message to the first UE, the second UE may transmit the corresponding information through an inter-UE communication link. For example, through the WLAN, the Bluetooth, or other communication device or communication link of which power consumption is low, the information described above may be transmitted to the corresponding UE.

Later, when the first UE receives the paging information from the second UE, the first UE may get out of the power saving mode and perform an operation for returning to the normal mode, and the normal mode may mean a normal camped normally state. In addition, when the first UE receives the information from the second UE, the first UE may restart an LTE modem operation and an LTE RF operation that were stopped.

In the case that the paging message that enables the first UE to get out of the power saving mode is the paging message indicating the mobile terminating call, the first UE may attempt the RRC connection setup procedure for an RRC connection establishment to a serving cell.

Hereinafter, a method of combining the method for acting as a proxy for the mobility operation and the method for acting as a proxy for performing paging according to the present invention described above will be described by dividing into 1. A method for the second UE to transmit new serving cell information to the first UE as fast as possible (or immediately) when the serving cell of the second UE is changed and 2. A method for the second UE to transmit new serving cell information to the first UE when the second UE is requested the new serving cell information, whereas the second UE does not forward the new serving cell information to the first UE immediately even in the case that the serving cell of the second UE is changed.

1. A Method for the Second UE to Transmit New Serving Cell Information to the First UE as Fast as Possible (or Immediately) when the Serving Cell of the Second UE is Changed FIG. 22 is a flowchart for a method for acting as a proxy for the mobility operation according to another embodiment of the present invention.

Figure 22:
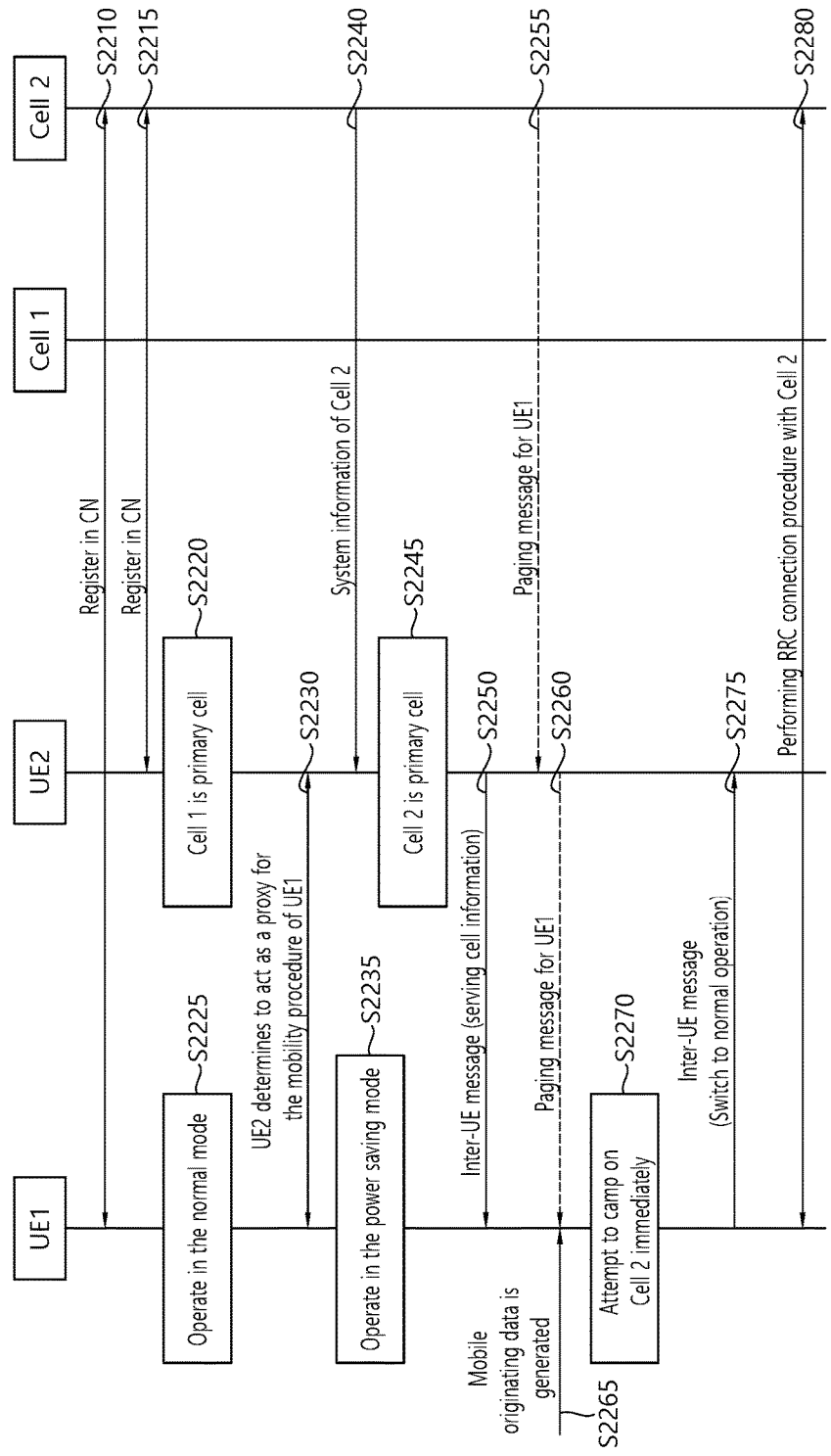
FIG. 22 is a flowchart for a method for acting as a proxy for the mobility operation according to another embodiment of the present invention.

Referring to FIG. 22, the first UE may register the information of the first UE in a CN (e.g., an MME) (step, S2210), and the second UE may register the information of the second UE in a CN (step, S2215). In this case, the primary cell of the first UE and the second UE may be "cell 1", that is, the serving cell of the first UE and the second UE may be cell 1 (step, S2220).

The first UE may operate in the normal mode (step, S2225), and the detailed example of the first UE operating in the normal mode is as described above.

The first UE and the second UE may determine that the second UE acts as a proxy for the mobility procedure of the first UE (step, S2230). In this case, the detailed content for the determination of acting as a proxy for the mobility procedure is as described above.

Later, the first UE operates in the power saving mode (step, S2235). In this case, the detailed content for operating in the power saving mode is as described above.

The second UE may receive the system information of cell 2 from cell 2 (step, S2240), and in some cases, the serving cell may be changed from cell 1 to cell 2 (step, S2245).

In this case, the second UE may transmit the information of the changed serving cell, that is, the information of cell 2 to the first UE through an inter-UE message (e.g., a message between UEs) as fast as possible (or immediately) (step, S2250).

The second UE may monitor a paging message for the first UE, and may receive the paging message for the first UE (step, S2255), and the detailed content for the second UE to monitor and receive the paging message for the first UE is as described above. Here, in the present specification, for the convenience of description, the step (S2255) that the second UE monitors a paging message for the first UE, and receives the paging message for the first UE is described after the step (S2240) that the second UE receives the system information of cell 2, the step (S2245) that cell 2 becomes the serving cell of the second UE, and the step (S2250) that the second UE transmits the inter-UE message to the first UE, but the present invention is not limited thereto. That is, in the present invention, after the step (S2255) that the second UE monitors a paging message for the first UE, and receives the paging message for the first UE is performed, the step (S2240) that the second UE receives the system information of cell 2, the step (S2245) that cell 2 becomes the serving cell of the second UE, and the step (S2250) that the second UE transmits the inter-UE message to the first UE may be performed. Furthermore, 1) the step (S2255) that the second UE monitors a paging message for the first UE, and receives the paging message for the first UE may be separately performed from 2) the step (S2240) that the second UE receives the system information of cell 2, the step (S2245) that cell 2 becomes the serving cell of the second UE, and the step (S2250) that the second UE transmits the inter-UE message to the first UE, that is, either one of the procedures may be performed.

In the case that the first UE receives the paging message for the first UE while the first UE is in the power saving mode (step, S2260), or a mobile originating data is generated (step, S2265) and the first UE is needed to enter the normal mode for communicating with a network, the first UE may return to the normal mode (step, S2270). At this time, in the case that the serving cell of the second UE is changed from cell 1 to cell 2 and the information of cell 2 is provided to the first UE, the first UE attempts to camp on cell 2 immediately, and in the case that the serving cell of the second UE is still cell 1, the first UE may camp on cell 1. In this case, the detailed example for the UE to enter the normal mode is as described above.

Later, the first UE may notify that the first UE performs a general operation, that is, returns to the normal mode to the second UE through an inter-UE message (step, S2275).

Then, in the case that the serving cell of the first UE is cell 2, the first UE performs an RRC connection procedure with cell 2 (step, S2280).

2. A Method for the Second UE not to Forward the New Serving Cell Immediately Even in the Case that the Serving Cell of the Second UE is Changed FIG. 23 is a flowchart for a method for acting as a proxy for the mobility operation according to another embodiment of the present invention.

Figure 23:
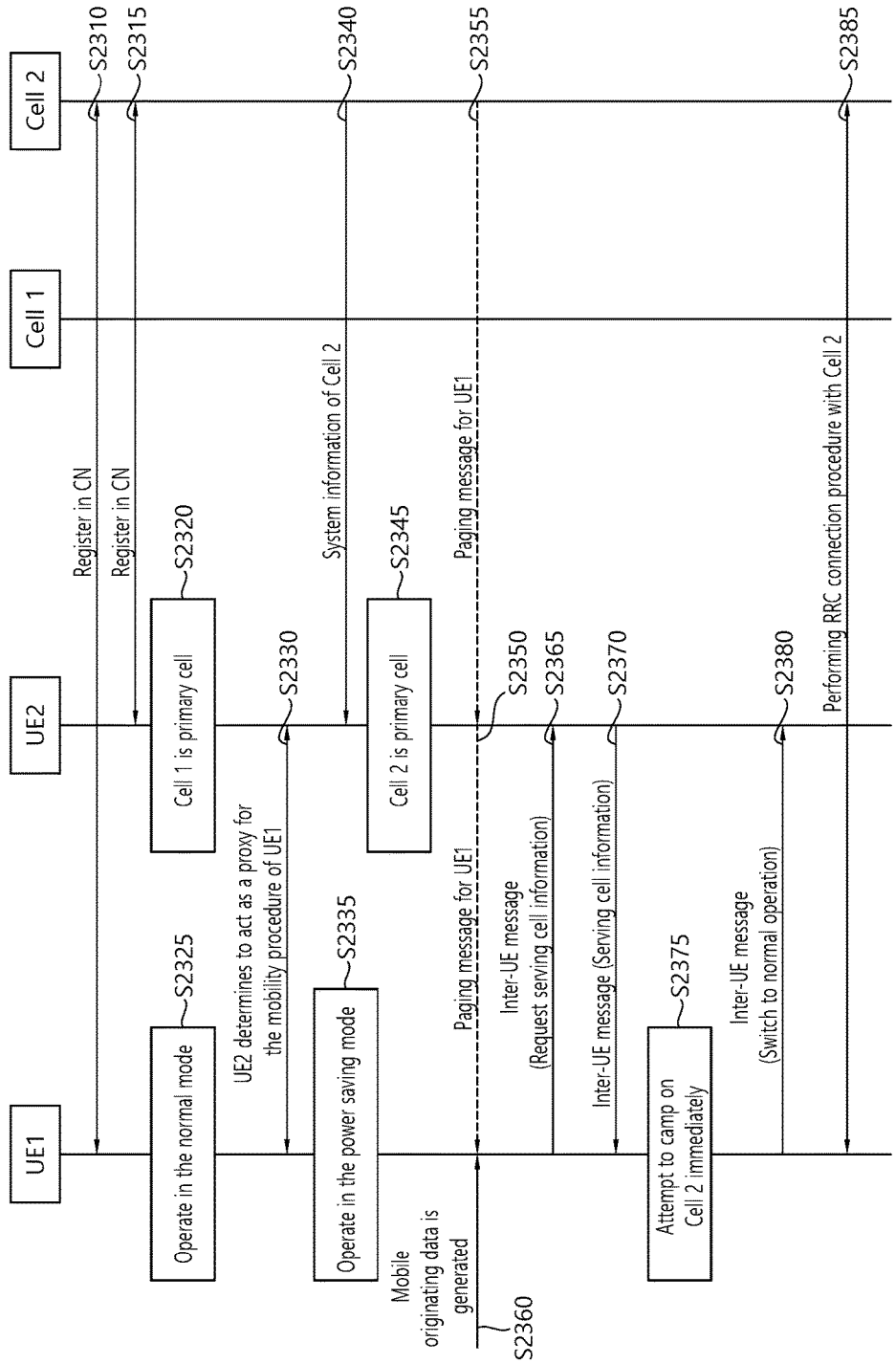
FIG. 23 is a flowchart for a method for acting as a proxy for the mobility operation according to another embodiment of the present invention.

Referring to FIG. 23, the first UE may register the information of the first UE in a CN (e.g., an MME) (step, S2310), and the second UE may register the information of the second UE in a CN (step, S2315). In this case, the primary cell of the first UE and the second UE may be "cell 1", that is, the serving cell of the first UE and the second UE may be cell 1 (step, S2320).

The first UE may operate in the normal mode (step, S2325), and the detailed example of the first UE operating in the normal mode is as described above.

The first UE and the second UE may determine that the second UE acts as a proxy for the mobility procedure of the first UE (step, S2330). In this case, the detailed content for the determination of acting as a proxy for the mobility procedure is as described above.

Later, the first UE operates in the power saving mode (step, S2335). In this case, the detailed content for operating in the power saving mode is as described above.

The second UE may receive the system information of cell 2 from cell 2 (step, S2340), and in some cases, the serving cell may be changed from cell 1 to cell 2 (step, S2345).

The second UE may monitor a paging message for the first UE, and may receive the paging message for the first UE (step, S2350), and the detailed content for the second UE to monitor and receive the paging message for the first UE is as described above. Here, in the present specification, for the convenience of description, the step (S2350) that the second UE monitors a paging message for the first UE, and receives the paging message for the first UE is described after the step (S2340) that the second UE receives the system information of cell 2 and the step (S2345) that cell 2 becomes the serving cell of the second UE, but the present invention is not limited thereto. That is, in the present invention, after the step (S2350) that the second UE monitors a paging message for the first UE, and receives the paging message for the first UE is performed, the step (S2340) that the second UE receives the system information of cell 2 and the step (S2345) that cell 2 becomes the serving cell of the second UE may be performed. Furthermore, 1) the step (S2350) that the second UE monitors a paging message for the first UE, and receives the paging message for the first UE may be separately performed from 2) the step (S2340) that the second UE receives the system information of cell 2 and the step (S2345) that cell 2 becomes the serving cell of the second UE, that is, either one of the procedures may be performed.

In the case that the first UE receives the paging message for the first UE while the first UE is in the power saving mode (step, S2355), or a mobile originating data is generated (step, S2360) and the first UE is needed to enter the normal mode for communicating with a network, the first UE may request serving cell information to the second UE through an inter-UE message (step, S2365). In response to the request from the first UE, the second UE may transmit the information of the serving cell to the first UE (step, S2370).

Later, the first UE may return to the normal mode (step, S2375). At this time, in the case that the serving cell of the second UE is changed from cell 1 to cell 2 and the information of cell 2 is provided to the first UE, the first UE attempts to camp on cell 2 immediately, and in the case that the serving cell of the second UE is still cell 1, the first UE may camp on cell 1. In this case, the detailed example for the UE to enter the normal mode is as described above.

Later, the first UE may notify that the first UE performs a general operation, that is, returns to the normal mode to the second UE through an inter-UE message (step, S2380).

Then, in the case that the serving cell of the first UE is cell 2, the first UE performs an RRC connection procedure with cell 2 (step, S2385).

In the embodiments of the present invention, a method for the second UE to act as a proxy for the handover operation is mainly described, but each of the procedures of the embodiments of the present invention may be combined with 1. A method for the second UE to act as a proxy for the paging operation and 2. A method for the second UE to act as a proxy for the mobility operation. That is, within each of the procedure of the embodiments of the present invention, 1. A procedure for the second UE to act as a proxy for the paging operation and 2. A procedure for the second UE to act as a proxy for the mobility operation may be combined, or before or after each of the procedure of the embodiments of the present invention, 1. A procedure for the second UE to act as a proxy for the paging operation and 2. A procedure for the second UE to act as a proxy for the mobility operation may be combined.

The detailed content for each of the methods (1. A method for the second UE to act as a proxy for the paging operation and 2. A method for the second UE to act as a proxy for the mobility operation) is as follows.

1. A Method for the Second UE to Act as a Proxy for the Paging Operation

Hereinafter, a method for acting as a proxy for the paging operation will be described in more detail. For the convenience of description, 1) A method for acting as a proxy for the paging operation performed by the second UE is described first, 2) Later, a method for acting as a proxy for the paging operation performed by the first UE is described.

1) First, a method for acting as a proxy for the paging operation performed by the second UE is described in detail.

A. A UE (e.g., the first UE) among a plurality of UEs (e.g., the first UE and the second UE) may determine to perform a proxy operation.

More particularly, the first UE requests to act as a proxy for the paging procedure. The request may be directly transmitted to the second UE or transmitted to the second UE through an eNB or an MME. The second UE determines whether to accept the request for acting as a proxy for the paging procedure based on a user priority of the second UE for the request or pro-configured information.

In order to perform the procedure of determining to act as a proxy for the paging procedure described above more efficiently, the first UE may include assistance information in the request (i.e., request for acting as a proxy for the paging procedure) described above.

The assistance information in this case may be as below.

UE device ID or user ID: The second UE that receives the request may regard the request as a valid request in the case that the request includes a specific device ID or a specific user ID. That is, in the case that the second UE receives the request and the request includes information of a specific device ID configured to perform the paging proxy operation of the second UE or an ID of a specific user configured to perform the paging proxy operation by the second UE, the second UE may regard the request as the valid request of determining to act as a proxy for the paging procedure.

Amount of battery remains in the first UE: In the case that the amount of battery remains of the second UE is a preconfigured threshold value or more, the second UE may determine to accept the request (i.e., the request of the paging proxy operation). In the case that the request includes the information of the amount of battery of the first UE, the second UE may determine to accept the request only in the case that the amount of battery of the first UE is a preconfigured threshold value or more.

Information indicating a paging occasion of the first UE: The second UE may receive the information indicating an UE ID of the first UE or a paging occasion of the first UE through the request, and may identify the paging occasion of the first UE. The paging occasion may include information indicating one or more radio frame numbers and one or more subframe numbers or an index indicating the radio frame and the subframe.

List of a tracking area: The list of a tracking area means that the tracking area update (TAU) procedure may not be performed in the area (or cell) included in the list. By considering the list of the tracking area, in the case that the tracking area of the first UE is changed, the second UE may determine whether to perform the TAU in place of the first UE.

Accessible PLMN list: The accessible PLMN list is a PLMN list that the first UE may access. By considering the accessible PLMN list, the second UE may determine whether to perform the TAU in place of the first UE. In the case that the second UE is camping on or accesses to a cell to which the first UE is unable to access, the second UE may notify the fact that the second UE accesses to the cell which is not accessible by the first UE, and may stop providing of the proxy mobility service to the first UE.

TAU periodic timer value: The timer value is information required to perform a TAU procedure periodically, and the second UE may act as a proxy for the TAU with the period indicated by the timer value.

The following two methods may be considered through which area the paging message for the UE provided with the proxy mobility is to be transmitted.

Method 1: When determining the UE (e.g., the second UE) that provides the proxy mobility service and the UE (e.g., the first UE) that is provided with the proxy mobility service, an MME manages the information that a certain UE (e.g., the second UE) provides the proxy mobility service to another UE (e.g., the first UE). Based on the information, the MME may determine a certain tracking area in which the paging message for the UE provided with the proxy mobility service is to be transmitted. For example, in the case that the second UE provides the proxy mobility service to the first UE, a network may transmit (or broadcast) the paging message to the first UE through the cell belonged to the tracking area in which the second UE is located.

Method 2: A network may transit (or broadcast) the paging message to the first UE through the cell belonged to the tracking area in which the UE (e.g., the first UE) of the UE (e.g., the first UE) provided with the proxy mobility service, and in this case, the location of the UE may be identified by the TAU procedure.

B. Later, the second UE performs a proxy for the paging operation for the UE (e.g., the first UE) authorized to perform the paging operation.

More particularly, when the second UE determines to act as a proxy for the paging operation required for a cellular operation of the first UE, the second UE may perform the following operation.

The second UE may monitor a paging additionally on the paging occasion of the first UE in addition to the paging occasion of the second UE.

The second UE may identify whether there is a UE identity of the first UE n addition to the UE identity of the second UE itself in the received paging message.

The second UE may identify whether the group ID in which the first UE is belonged is included in the received paging message.

When the second UE receives the paging message including the UE identity of the first UE, the second UE may regard the corresponding paging message (i.e., the paging message including the UE identity of the first UE) as the paging message for the first UE.

The second UE may perform idle mode mobility (e.g., cell selection) and a cell reselection procedure in place of the first UE.

The second UE may possess the latest system information by performing the system information monitoring operation in place of the first UE. In this case, the system information may mean the system information of the first UE.

While the second UE receives a paging for the first UE, the second UE may act as a proxy for the UE location update procedure (e.g., TAU) for the first UE. Hereinafter, based on the TAU procedure, the proxy of the UE location update procedure is described. In order for the second UE to perform the TAU for the first UE, the following method may be used.

Method 1: The second UE may generate a TAU request message in place of the first UE, and may transmit it to an MME. According to the method, it is assumed that the second UE receives the parameter required to generate the TAU request message of the first UE from the first UE or the network in advance, and the second UE knows the parameter. For example, during the procedure of negotiating the paging proxy operation between the first UE and the second UE, the second UE receives the parameter included in the TAU request message from the first UE. The parameter means contents of the TRACKING AREA UPDATE REQUEST (TAU UPDATE) message of 3GPP TS24.301. When the second UE generates the TAU message, it includes the parameter of the UE identifier type, and the parameter received from the first UE is used for most parameters. However, in the case of a DRX configuration, it may be considered to generate the TRACKING AREA UPDATE REQUEST message of the first UE using the current DRX configuration value of the second UE. In this case, when the network is going to page the first UE, the paging is performed according to the paging configuration of the second UE, and thus, it is easy to perform the paging proxy reception for the first UE by the second UE.

Method 2: The second UE may generate a TAU request message in place of the first UE, and may transmit it to an MME, but the TAU request message includes contents used for the second UE to perform its own TAU REQUEST generally, and further includes the identification information of the first UE.

Method 3: The first UE generates a TAU request message, and transmits it through direct communication link to the second UE. The second UE may receive a TAU message from the first UE, and may transmit the received TAU message to a network. Here, the first UE may enter the power saving mode immediately after transmitting the TAU request to the second UE. Otherwise, the first UE may enter the power saving mode immediately after receiving a TAU accept message from the second UE in response to the TAU request.

C: The second UE may forward the information of the paging of the first UE to the first UE through an inter-UE direct communication link.

More particularly, in the case that the second UE receives a paging but the second UE determines the received paging to be a paging message for the first UE, the second UE may notify the fact that the paging is incoming to the first UE. For this, the second UE may forward the paging message itself to the first UE, or may forward the information (e.g., field(s) included in the paging message) included in the paging message.

Meanwhile, when the second UE receives a paging message for system information modify notification, and in the case that a UE ID indicating the first UE is not included in a paging record of the paging message (i.e., the paging message for system information modify notification), the second UE may not transfer the paging message to the first UE. After the second UE obtains the updated system information later, it is available for the second UE to transmit the updated system information to the first UE.

Meanwhile, when the second UE receives a paging message indicating that an emergency message is transmitted through the system information, the following two methods may be considered.

Method 1: Without regard to whether the UE ID indicating the first UE is not included in a paging record of the paging message (i.e., the paging message through which an emergency message is transmitted through the system information), the second UE may transmit the paging message (i.e., the paging message through which an emergency message is transmitted through the system information) to the first UE, and accordingly, the first UE may receive the emergency message directly from a serving cell. Or, Method 2: Without regard to whether the UE ID indicating the first UE is not included in a paging record of the paging message (i.e., the paging message through which an emergency message is transmitted through the system information), after the second UE receives the emergency message indicated by the paging message, the second UE may transmit the emergency message to the first UE.

When the second UE transfers the fact that the paging is incoming to the first UE and/or the information included in the paging message, the second UE may transmit the information (i.e., fact that the paging is incoming and/or the information included in the paging message) through an inter-UE communication link. For example, through the WLAN, the Bluetooth or other communication device and communication link of which power consumption is low, the information (i.e., fact that the paging is incoming and/or the information included in the paging message) may be transmitted to the corresponding UE (e.g., the first UE).

2) Later, a method for acting as a proxy for the paging operation performed by the first UE is described in detail.

A. The first UE determines to perform the proxy operation. In this case, the detailed content for determining to perform the proxy operation is as described above.

B. Later, the first UE enters the power saving mode.

More particularly, while the second UE receives a paging for the first UE, the first UE may not receive a paging. Accordingly, the first UE may save the power consumption owing to the paging reception. That is, while the second UE acts as a proxy for the paging reception for the first UE in order to maximize the power consumption decrease, the first UE may operate in the power saving mode of which power consumption is low.

The power saving mode may mean an operation mode in which a UE (e.g., the first UE) may not operate to monitor the paging message transmitted from a network (serving cell).

The power saving mode may mean an operation mode in which a UE (e.g., the first UE) may not perform a measurement for a cell selection and a cell reselection although the UE is in an idle mode.

The power saving mode may mean an operation mode in which a UE may not operate to monitor the system information.

The power saving mode may be the power saving mode of 3GPP standard.

The power saving mode may mean an operation mode in which a UE may not operate to monitor the control channel (e.g., PDCCH, E-PDCCH, etc.) indicating schedule information.

C. Later, the first UE may receive the paging information from a UE (e.g., the second UE) authorized to perform the paging operation. In this case, the paging information received by the first UE may mean the paging information that the second UE described above forwards to the first UE.

D. Later, the first UE may return to the normal mode. More particularly, when the first UE receives the paging information from the second UE, the first UE gets out of the power saving mode, and may perform an operation for returning to the normal mode. Here, the normal mode may mean a camped normally state. When the first UE receives information from the second UE, the first UE may restart the UE operation and LTE RF operation that was stopped or performed in low frequency. The first UE may perform a cell selection in order to enter the normal mode, and may try to camp on a suitable cell by receiving the system information from a network. In this case, the first UE may regard the serving cell of the second UE as a serving cell of the first UE. When the first UE enters the normal mode, in the case that the first UE regards the serving cell of the second UE as the serving cell of the first UE, the time until the first UE camps on the serving cell may be decreased. For this (i.e., when the first UE enters the normal mode, in order to regard the serving cell of the first UE as the same cell of the serving cell of the second UE), the second UE may forward the serving cell information of the second UE and the system information of the serving cell (i.e., the serving cell of the second UE) to the first UE. The first UE may attempt to camp on by synchronizing with the cell indicated by the serving cell information received from the second UE preferentially. In this case, the first UE uses the serving cell information received from the second UE, and accordingly, the first UE may camp on the corresponding cell quickly.

As a subsequent procedure, in the case that the corresponding paging message is a paging message indicating a mobile terminating call after the first UE camps on the serving cell, the first UE may attempt an RRC connection setup procedure for an RRC connection establishment in the serving cell.

2. A Method for the Second UT to Act as a Proxy for the Handover

Hereinafter, a method for acting as a proxy for a handover procedure will be described in detail. For the convenience of description, 1) A method for acting as a proxy for a handover operation in the aspect of the first UE, 2) A method for acting as a proxy for a handover operation in the aspect of the second UE, and 3) A method for acting as a proxy for a handover operation in the aspect of a source cell will be described. Hereinafter, for the convenience of description, in the mobility proxy operation procedure, a handover proxy operation procedure may be included, or the mobility proxy operation procedure may be used as the same concept of the handover proxy operation procedure.

1) A Method for Acting as a Proxy for a Handover Operation in the Aspect of the First UE A. The first UE determines to perform the proxy operation with the second UE More particularly, a UE among two or more UEs performs a procedure of agreeing to provide a proxy mobility service to another UE. The first UE request to perform the proxy mobility procedure to the second UE. The request to perform the proxy mobility procedure may be directly transmitted to the second UE or may be transmitted via an eNB or an MME. The second UE may determine whether to accept the request based on a user preference or preconfigured information.

In the case that the first UE and the second UE determine to perform the proxy operation through signaling, a UE (i.e., the first UE or the second UE) among the UEs (i.e., the first UE and the second UE) in relation to the proxy operation may notify the information that the performance of the proxy operation is determined to a network. In this case, the information that the performance of the proxy operation is determined may be information indicating that a certain UE is going to act as a proxy for the mobility procedure of another UE. For example, a UE (e.g., the second UE) that is going to act as a proxy for the mobility procedure may notify that the UE is going to act as a proxy for the mobility procedure of the second UE to a serving cell of the second UE. As another example, a UE (e.g., the second UE) that is going to act as a proxy for the mobility procedure may notify that the UE is going to act as a proxy for the mobility procedure of the first UE to a serving CN (e.g., an MME) of the second UE through a NAS message.

B. Later, the first UE may enter the power saving mode.

Particularly, a UE (e.g., the first UE) that is going to be provided with the mobility proxy service from the UE (e.g., the second UE) authorized with the mobility procedure may operate in the power saving mode. The UE (e.g., the first UE) that authorizes the mobility procedure may omit or perform with low frequency the operations that the UE should perform in the normal RRC-connected mode (here, the detailed contents for the operation that should be performed in the normal RRC-connected mode is as described above) during the power saving mode. For example,

- The UE may not perform a measurement of a serving cell/neighboring cell which is required for the mobility support.
- The UE may perform a measurement of a serving cell/neighboring cell which is required for the mobility support with lower frequency than that of the second UE.
- The UE may not perform a control channel monitoring required for the mobility support.
- The UE may perform a control channel monitoring required for the mobility support with lower frequency than that of the second UE.
- The UE may not perform a control channel monitoring required for a downlink scheduling.
- The UE may omit a paging reception for maintaining system information (e.g., SIB) as the latest state in a connected mode.
- The UE may omit a paging reception for receiving an urgent message in a connected mode.

C. When the first UE transmits UE generated data or identify UE terminating data, the first UE may return to the normal mode.

More particularly, when a mobile originating data is occurred in the first UE and the first UE is going to transmit the data or the first UE identifies that there is a mobile terminating data that the first UE should receive, the first UE may be switched from the power saving mode to the normal mode with respect to the RRC connection.

In this case, the first UE may request the information of the UE configuration or the serving cell that the first UE is going to use to the second UE that provides a mobility proxy service to the first UE itself. That is, when the first UE transmits the UE generated data or identifies the UE terminating data, the step for the first UE to return to the normal mode may further include a step of requesting the information of the UE configuration or the serving cell that the first UE is going to use to the second UE that provides a mobility proxy service to the first UE itself.

Here, the second UE that receives the request may transmit the information of the serving cell or the UE configuration information that the first UE is going to use to the first UE. The information of the serving cell may include a serving cell identifier (i.e., information for identifying the serving cell), and in addition, the system information of the serving cell may be also included in the information of the serving cell. That is, in the case that the first UE transmits the UE generated data or identifies the UE terminating data the step for the first UE to return to the normal mode may further include a step for the first UE to receive the serving cell information and the UE configuration information that the first UE is going to use from the second UE.

The above described information (i.e., the serving cell information and/or the UE configuration information) may be transmitted via the direct communication link between UEs or other communication node. For example, the information (i.e., the serving cell information and/or the UE configuration information) may be transmitted by using the communication technique that may perform the inter-UE information transmission with low power such as the inter-UE direct communication link using the Wi-Fi, the inter-UE communication link using the Bluetooth or the inter-UE direct communication link using LTE, and so on.

Later, the first UE may store the RRC configuration based on the information received from the second UE, and may regard the serving cell as the primary cell of the first UE based on the information of the serving cell received from the second UE.

The first UE may try to synchronize to the serving cell by using the stored RRC configuration.

More particularly, the first UE that receives the information may reconfigure the first UE itself by using the received UE information. The reconfiguration of the first UE by using the received information may be seen as substantially the same as the first UE reconfigure by receiving the received information from an eNB. That is, the process for the first UE to perform the synchronization process with the serving cell configured to the first UE based on the information received from the second UE may be the same as the process for the first UE to perform the synchronization process by receiving the information from the serving cell.

The first UE may try to perform the synchronization process with respect to the serving cell indicated by the second UE based on the received serving cell information. The synchronization process may include downlink synchronization and/or uplink synchronization. The uplink synchronization may include a random access procedure, and in this case, the random access procedure may be tried for the received serving cell. Through the random access procedure, it is possible for the first UE to notify that the UE gets out of the power saving mode and operates in the normal mode to the serving cell.

In the case that the first UE completes the reestablishment and the synchronization process based on the information received from the second UE, the first UE may return to the normal operation mode. In this case, the first UE may notify the fact that the first UE returns to the normal operation mode to another UE (e.g., the second UE) that has been providing the mobility proxy service to the first UE.

When the UE (e.g., the second UE) that has been performing the mobility proxy operation receives a notification of returning to the normal operation mode from the mobility proxy target UE (e.g., the first UE), the second UE may notify that the mobility proxy target UE (e.g., the first UE) returns to the normal operation mode to the serving cell.

Meanwhile, the first UE may determine on whether to switch to the normal operation mode for each bearer and/or application. For example, the first UE may perform the operation described above (i.e., the operation of returning to the normal mode) only when the mobile generated data is generated with respect to a specific bearer and/or application and the first UE is going to transmit data, and may operate only in the power saving mode with respect to other bearer and/or application. For example, when starting a voice/video service, the first UE may be switched the normal mode, and the first UE may operate in the power saving mode with respect to a messaging service.

2) A Method for Acting as a Proxy for a Handover Operation in the Aspect of the First UE A. The second UE determines to perform a proxy operation with the first UE. In this case, the method of determining the proxy operation of the second UE with the first UE is as described above.

B. Later, the second UE may perform a procedure of acting as a proxy the mobility of the first UE in order to act as a proxy for the operation for the handover of the first UE.

More particularly, the second UE that plans to provide the mobility proxy service to the first UE performs a normal operation performed in the RRC connected mode, and performs the mobility proxy service for the first UE additionally. The procedure performed by the second UE may include the following operation.

When transmitting a measurement report message including the measurement result of a serving cell and/or a neighboring cell to a serving cell, the second UE may notify that the second UE is currently support the mobility procedure of another UE (e.g., the first UE).

Periodically or when there is a request from an eNB, the second UE may report information on whether the second UE provides the mobility proxy service to another UE (e.g., the first UE) currently to a serving cell.

When the second UE notifies the information to a network (e.g., a serving cell), the second UE may transmit an ID (C-RNTI or S-TMSI) of the UE (e.g., the first UE) provided with the mobility proxy service from the second UE to the network.

C. Later, when the second UE receives a handover command from the existing serving cell (here, the existing serving cell may mean a source cell), the second UE may perform handover to a new cell (e.g., a target cell).

More particularly, the existing serving cell (here, the existing serving cell mean the source cell that the second UE establishes an RRC connection originally) may transfer a handover command to the second UE.

The handover command (e.g., the handover command received by the second UE from the source cell) includes the information enables the second UE to identify a target cell that the second UE is going to move by performing the handover. In addition, the handover command may further include the UE configuration that the second UE is going to use in the target cell and the UE configuration that the target cell that the second UE performs the mobility proxy operation is going to use, that is, the UE configuration that the first UE is going to use in the target cell. In summary, the handover command may include a configuration (e.g., an RRC configuration for the first UE and/or the second UE) in relation to the handover for the first UE and/or the second UE.

In summary, the handover message, that is, a single RRC message may include an RRC message container for handover of the first UE as well as the information element indicating the configuration for the second UE. Or, the single RRC message may include the information element (IE) of both of the handover of the first UE and the handover the second UE.

When the second UE receives the handover command, the second UE may perform handover to a target cell indicated through the handover command. The handover command received by the second UE may include the UE configuration that another UE (e.g., the first UE) is going to use in the target cell, and in such a case, the second UE may store the UE configuration for the first UE. That is, when the second UE performs handover to the target cell, the handover command received by the second UE may include the UE configuration for the first UE to which the second UE provides the mobility proxy service in addition to the UE configuration for the second UE. Accordingly, the second UE may store the UE configuration for the first UE.

a) In the case that a problem occurs in a handover preparation process between eNBs during the handover procedures, or in the case that the second UE performs an Connection Re-establishment owing to a handover failure, and the like or the second UE enters an RRC idle mode, the second UE may notify that the proxy operation and/or the mobility proxy operation is stopped to the first UE. When the second UE notifies that the proxy operation and/or the mobility proxy operation are stopped to the first UE, the first UE may perform either one of the following options.

First option: When the first UE knows that the proxy operation and/or the mobility proxy operation are stopped, the first UE is switched from the power saving mode to the normal mode, and a MAC layer of the first UE may perform an uplink transmission to a source cell through a random access procedure, a scheduling request procedure, a Buffer Status report procedure, and so on.

Second option: When the first UE knows that the proxy operation and/or the mobility proxy operation are stopped, the first UE is switched from the power saving mode to the normal mode, and an RRC layer of the first UE may perform an RRC Connection Re-establishment procedure. In this case, the first UE may perform a cell selection to a source cell or a target cell.

Third option: When the first UE knows that the proxy operation and/or the mobility proxy operation are stopped, the first UE is switched from the power saving mode to the normal mode, and an RRC layer of the first UE notifies the switch to the normal mode (i.e., the information that the first UE enters the normal mode) to a source cell by transmitting an uplink RRC message.

Fourth option: When the first UE knows that the proxy operation and/or the mobility proxy operation are stopped, the first UE is switched from the power saving mode to the normal mode, and a NAS layer of the first UE notifies the switch to the normal mode (i.e., the information that the first UE enters the normal mode) to an MME by transmitting an uplink NAS message, and the MME notifies the fact (i.e., the information that the first UE enters the normal mode) to a source cell.

Fifth option: When the first UE knows that the proxy operation and/or the mobility proxy operation are stopped, the first UE is switched from the power saving mode to the normal mode, and the first UE enters an RRC_IDLE mode. Later, a NAS layer of the first UE notifies the switch to the normal mode (i.e., the information that the first UE enters the normal mode) to an MME by transmitting an uplink NAS message.

In addition, when the proxy operation and/or the mobility proxy operation are stopped, the first UE or the second UE may notify that the first UE is switched to the normal mode to an MME, and the MME may notifies the fact (i.e., the information that the first UE enters the normal mode) to a source cell again. As another method, the first UE or the second UE may notify that the first UE is switched to the normal mode to a source cell directly, or to a target cell. In this case, when the first UE notifies the fact that the first UE is switched to the normal mode, the target cell may notify the fact that the first UE is switched to the normal mode to the source cell through a notification.

Furthermore, when the proxy operation and/or the mobility proxy operation are stopped, the source cell may notify that the first UE is switched to the normal mode to an MME.

b) Meanwhile, since a target cell does not support the proxy operation and/or the proxy mobility, the target cell may accept the handover of the second UE, but may not accept and/or configure the proxy operation and/or the proxy mobility. In such a case, one of the options below may be applied to the first UE, the second UE, a source cell and a target cell.

First option: A target cell may divide a handover command for the first UE and a handover for the second UE, and may transfer it to a source cell. That is, the source cell may transmit separate handover commands to the first UE and the second UE, respectively. In this case, the handover commend for the first UE may also be transmitted to the first UE through the second UE.

When the first UE a separate handover command through the source cell or the second UE, the first UE is switched to the normal mode, and stops the proxy operation and/or the proxy mobility. And the first UE may transmit an uplink message like a handover (HO) complete and the like by performing an operation like a random access to the target cell.

Second option: While a target cell transmits a handover command for the second UE, the target cell may notify that a separate handover is available for the first UE to a source cell. The source cell notifies the fact (i.e., a separate handover is available for the first UE) to the first UE through the second UE, and accordingly, the first UE may be switched to the normal mode, and may stop the proxy operation and/or the proxy mobility. Later, the first UE may transmit an uplink message like a handover complete by performing a random access and the like to the target cell.

Third option: While a target cell transmits a handover command for the second UE, the target cell may notify that a separate handover is available for the first UE to a source cell. In this case, the source cell notifies the fact that a separate handover is available for the first UE to the first UE through the second UE, and accordingly, the first UE may be switched to the normal mode, and may stop the proxy operation and/or the proxy mobility. Later, the first UE may perform an RRC Connection Re-establishment to the target cell or may perform an RRC Connection Establishment.

Fourth option: While a target cell transmits a handover command for the second UE, the target cell may notify that a separate handover is available for the first UE to a source cell. In this case, the source cell notifies the fact that a separate handover is available for the first UE to the first UE through the second UE, and accordingly, the first UE may be switched to the normal mode, and may stop the proxy operation and/or the proxy mobility. And, the first UE may transmit a measurement report to the source cell. The measurement report may include the measurement result (e.g., RSRP and/or RSRQ) of the first UE with respect to the source cell and the target cell, and the source cell may determine the handover of the first UE according to the measurement result.

D. When there is a request of the first UE, the second UE may transmit the information of the new serving cell determined by the handover to the first UE.

More particularly, the handover command that the second UE transmits to the first UE may be transferred through an RRC message included in an RRC container or may be transferred by the information element itself. Here, in the case that the RRC message is included in the RRC container, the second UE may reconstruct the RRC message.

3) A Method for Acting as a Proxy for a Handover Operation in the Aspect of a Source Cell A. a source cell may identify whether the second UE is operating the proxy operation.

More particularly, when the source cell receives a measurement result and the like from the second cell or determines to change a serving cell of the first UE and/or the second UE based on an eNB internal reference, the source cell may identify whether the second UE acts as a proxy for a mobility procedure of another UE (i.e., the first UE).

B. In the case that the second UE acts as a proxy for the mobility procedure of the first UE, the source cell transmits the information of the first UE and the second UE to a target cell.

More particularly, as described above, when the source cell knows that the second UE is performing a proxy operation, while the source cell performs a handover preparation procedure to a target cell, the source cell may perform the handover preparation procedure for a UE (e.g., the first UE and/or the second UE) that requires the mobility to the target cell. In summary, the source cell may perform the preparation procedure of the handover for the first UE as well as handover for the second UE.

For example, when the source cell performs the handover preparation procedure to the target cell, that is, in the case that the UE requiring the mobility, that is the UE (i.e., the second UE) required to perform the handover performs the mobility procedure for another UE (e.g., the first UE), the source cell may transfer the information of the target cell (i.e., the first UE) in which the mobility procedure is supported by the second UE to the target cell as well as the information of the second UE. Here, the information that the source cell transfers to the target cell may include an AS configuration and an AS context of the UE.

In the case that the source cell does not know the AS configuration of the UE (i.e., the first UE) that is supported with the mobility procedure, the source cell may notify the fact that it is required to fetch the AS configuration for the first UE to the target cell. The target cell that receives the notification may request a core network (CN) to transmit the UE capability of the UE (i.e., the first UE).

C. The source cell may receive a handover command for the first UE and/or the second UE from the target cell.

More particularly, when the target cell completes the handover preparation procedure successfully, the target cell may transfer the handover command including the UE configuration that one or more UEs (e.g., the first UE and/or the second UE) are going to use in the target cell to the source cell. That is, the source cell may receive the handover command including the UE configuration that the first UE and/or the second UE are going to use in the target cell from the target cell. In other words, according to the present invention in which one UE (e.g., the second UE) performs the proxy mobility for another UE (e.g., the first UE), the target cell may transfer the UE configuration that the first UE and/or the second UE are going to use in the target cell to the source cell.

In order to support the procedure above described, in the case that the target cell supports the proxy operation and/or the proxy mobility, the target cell may notify whether itself (i.e., the target cell) supports the proxy operation and/or the proxy mobility to neighboring cells including the source cell through X2 interface. Or, an MME may notify whether to support the proxy operation and/or the proxy mobility to lower cells (i.e., a cell subjected to the MME).

Meanwhile, the handover preparation procedure may be progressed only for the second UE (e.g., the handover preparation procedure may not be progressed for the first UE). For example, in the case that the target cell does not support the proxy mobility service, the target cell does not support the power saving mode or the target cell is in short of network resource and/or radio resource for supporting the first cell (i.e., for providing a communication to the first UE), the target cell may accept the handover of the second UE but fails to accept the handover of the first UE.

Accordingly, during the handover preparation procedure, the target cell may notify the information that only the handover of the second UE is rejected selectively.

In the case that the target cell selectively accepts the handover for a part of UEs (e.g., only the second UE) and the handover of the first UE is rejected, according to the determination of the source cell, only the second UE may perform handover to the target cell. In this case, the source cell or the second UE may notify that the proxy operation and/or the proxy mobility are stopped to the first UE.

Meanwhile, the target cell may not support the proxy operation and/or the proxy mobility originally as described above. In the case that the target cell does not notify that the proxy operation and/or the proxy mobility are not supported, the source cell may perform the handover preparation procedure separately for the first UE and the second UE. In this case, the handover is attempted to the target cell in which the proxy operation and/or the proxy mobility are not supported, the source cell or the second cell may notify that the proxy operation and/or the proxy mobility are stopped.

Figure 24:
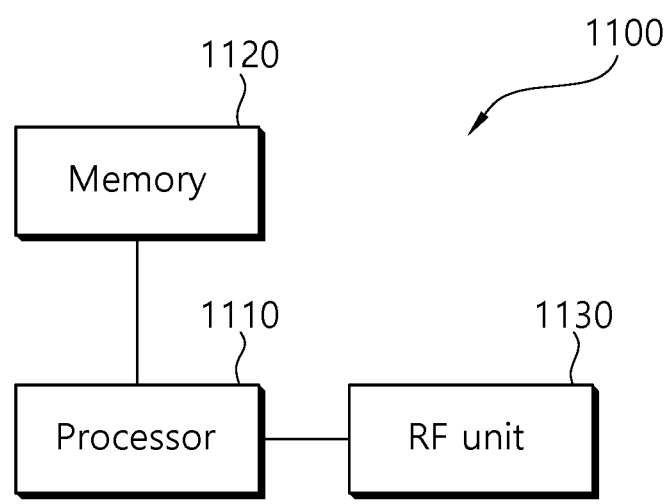
FIG. 24 is a block diagram illustrating a UE in which the embodiments of the present invention are implemented.

FIG. 24 is a block diagram illustrating a UE in which the embodiments of the present invention are implemented.

Referring to FIG. 24, a UE 1100 includes a processor 1110, a memory 1120 and a radio frequency (RF) unit 1140. The processor 1110 implements the proposed functions, processes and/or methods.

The RF unit 1140 is connected with the processor 1110, and transmits and receives radio signals.

The processor may include an application-specific integrated circuit (ASIC), a separate chipset, a logic circuit, and/or a data processing unit. The memory may include a read-only memory (ROM), a random access memory (RAM), a flash memory, a memory card, storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

What is claimed is:

1. A method for entering a power saving mode in a wireless communication system, the method performed by a first user equipment (UE) and comprising:
    entering the power saving mode when a second UE acts as a proxy for a procedure in relation to mobility of the first UE,
    wherein an amount of battery of the first UE is smaller than an amount of battery of the second UE; and
    transmitting information of the power saving mode to a network,
    wherein, in the power saving mode, the procedure in relation to mobility of the first UE is performed relatively infrequently as compared to when the first UE is not in the power saving mode, and
    wherein, in the power saving mode, the first UE receives information of a serving cell through the second UE, in the power saving mode.

2. The method of claim 1, wherein, in the power saving mode,
    a measurement of a serving cell and a neighboring cell required for performing the procedure in relation to mobility of the first UE is not performed,
    a measurement of a serving cell and a neighboring cell required for performing the procedure in relation to mobility of the first UE is performed with low frequency in comparison with the second UE,
    a paging reception is omitted, or
    a paging reception is performed with low frequency.

3. The method of claim 1, wherein the information of the serving cell includes at least one of a serving cell identity, a serving cell frequency, system information set 1, or system information set 2.

4. The method of claim 1, further comprising:
    receiving a paging message for the first UE through the second UE; and
    returning to a normal mode based on the information of the serving cell.

5. The method of claim 4, further comprising transmitting information indicating returning to the normal mode to the second UE after returning to the normal mode.

6. The method of claim 1, further comprising returning to a normal mode based on the information of the serving cell when a mobile originating data is generated.

7. The method of claim 1, further comprising:
    receiving a paging message for the first UE through the second UE;
    requesting the information of the serving cell to the second UE; and
    returning to a normal mode based on the information of the serving cell, wherein receiving the information of the serving cell through the second UE is performed after requesting the information of the serving cell.

8. The method of claim 1, further comprising:
requesting the information of the serving cell to the second UE when a mobile originating data is generated; and
returning to a normal mode based on the information of the serving cell,
wherein receiving the information of the serving cell through the second UE is performed after requesting the information of the serving cell to the second UE.

9. The method of claim 1, wherein the first UE is in a Radio Resource Control (RRC) idle state.

10. A first user equipment (UE), comprising:
a radio frequency (RF) unit configured to transmit and receive a radio signal; and
a processor connected with the RF unit,
wherein the processor is configured to:
enter a power saving mode when a second UE acts as a proxy for a procedure in relation to mobility of the first UE,
wherein an amount of battery of the first UE is smaller than an amount of battery of the second UE; and
transmit information of the power saving mode to a network,
wherein, in the power saving mode, the procedure in relation to mobility of the first UE is performed relatively infrequently as compared to when the first UE is not in the power saving mode, and
wherein, in the power saving mode, the first UE receives information of a serving cell through the second UE, in the power saving mode.

* * * * *